(12) United States Patent
Usui

(10) Patent No.: US 6,826,239 B1
(45) Date of Patent: *Nov. 30, 2004

(54) MODULATING METHOD, MODULATOR, DEMODULATING METHOD AND DEMODULATOR

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/402,758

(22) PCT Filed: Feb. 12, 1999

(86) PCT No.: PCT/JP99/00624

§ 371 (c)(1),
(2), (4) Date: Jan. 31, 2000

(87) PCT Pub. No.: WO99/41865

PCT Pub. Date: Aug. 19, 1999

(30) Foreign Application Priority Data

Feb. 13, 1998 (JP) .............................................. 10/31620
Apr. 10, 1998 (JP) .............................................. 10/99631

(51) Int. Cl.[7] .......................... H03D 1/00; H04L 27/06
(52) U.S. Cl. ........................ 375/340; 375/341; 714/701
(58) Field of Search ................................. 375/341, 340, 375/376, 316, 296, 267; 370/207, 210, 529, 485, 441; 708/404

(56) References Cited

U.S. PATENT DOCUMENTS

| | | | | | |
|---|---|---|---|---|---|
| 4,615,040 A | * | 9/1986 | Mojoli et al. | ................ | 375/267 |
| 5,610,908 A | * | 3/1997 | Shelswell et al. | ........... | 370/210 |
| 5,768,318 A | * | 6/1998 | Mestdagh | .................... | 375/296 |
| 5,949,796 A | * | 9/1999 | Kumar | ....................... | 370/529 |
| 6,067,330 A | * | 5/2000 | Usui | .......................... | 375/340 |
| 6,115,728 A | * | 9/2000 | Nakai et al. | ................ | 708/404 |

* cited by examiner

Primary Examiner—Stephen Chin
Assistant Examiner—Curtis Odom
(74) Attorney, Agent, or Firm—Jay H. Maioli

(57) ABSTRACT

A demodulator includes a selecting unit selecting and outputting designated points of data from N points of data outputted from a Fourier transform circuit and an output order data generating unit generating data for designating points selected by this selecting unit. The selection processing of the selecting unit includes de-interleave processing to thereby allow realizing generation processing and demodulation processing for generating and demodulating an interleaved OFDM modulation signal with a simple constitution in a short processing time.

21 Claims, 19 Drawing Sheets

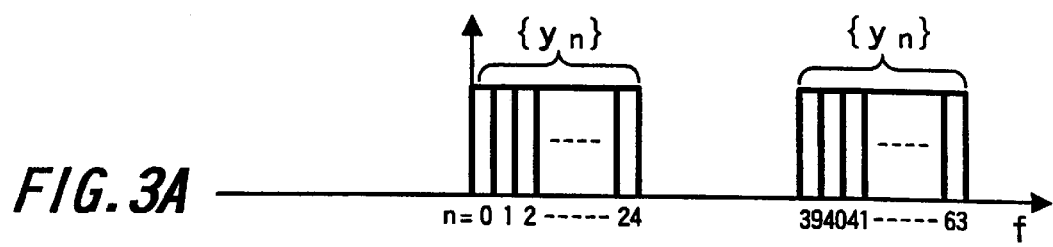
FIG. 3A
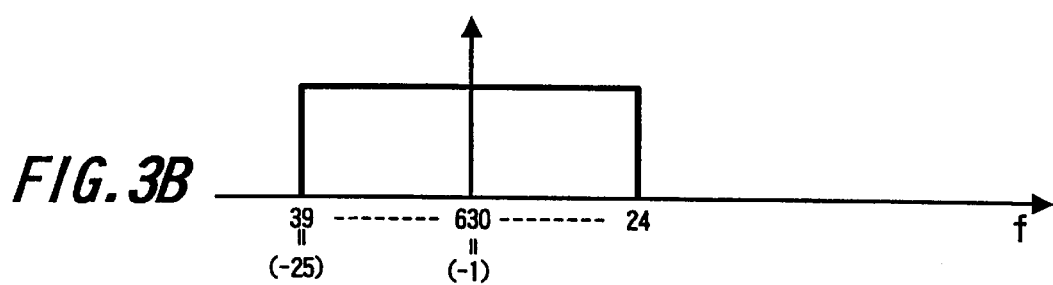
FIG. 3B
FIG. 4
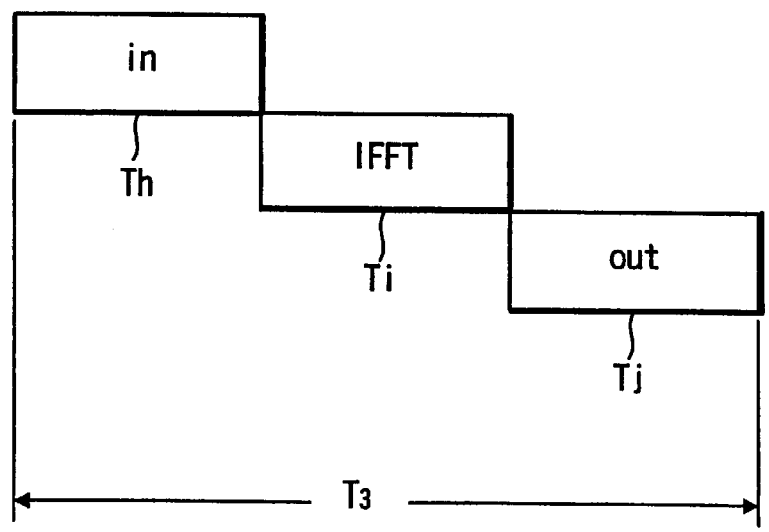

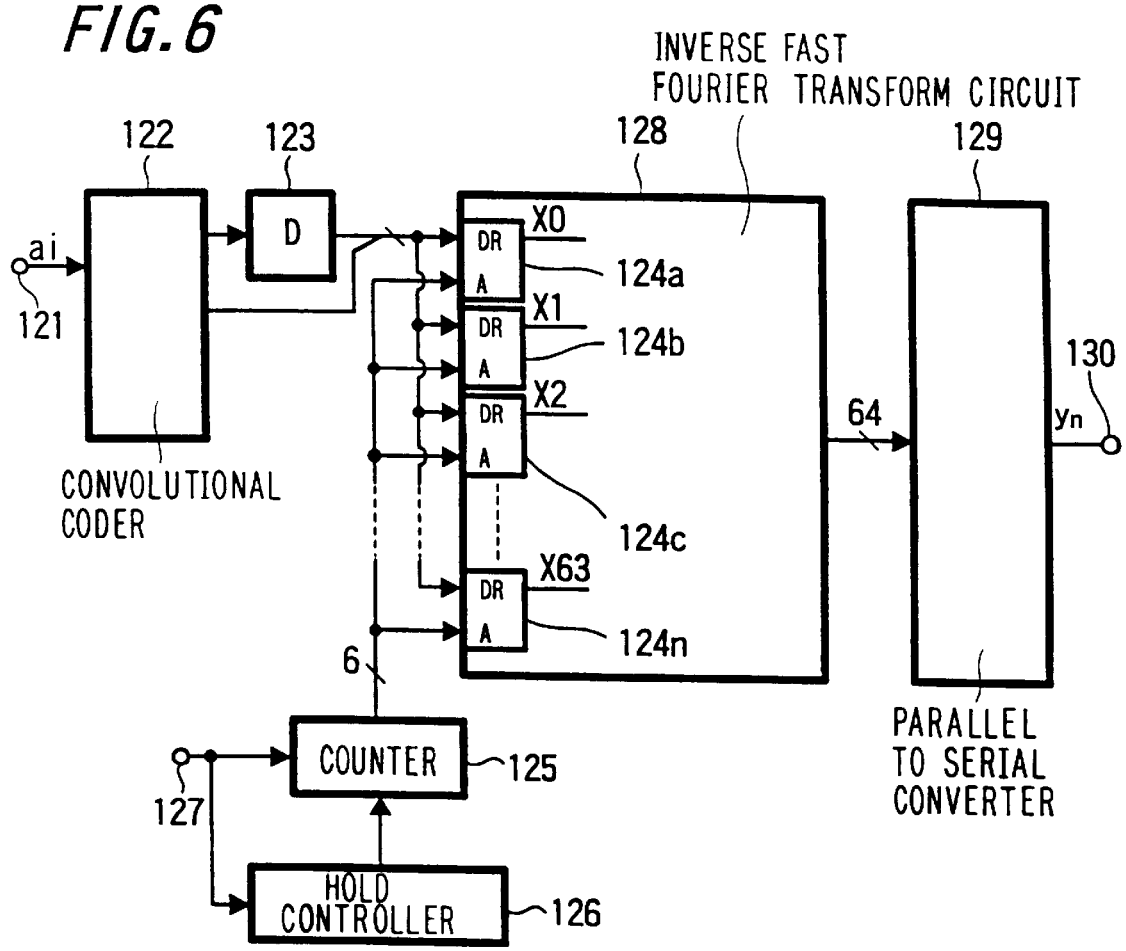
FIG. 6
FIG. 7A
FIG. 7B
FIG. 7C
FIG. 7D

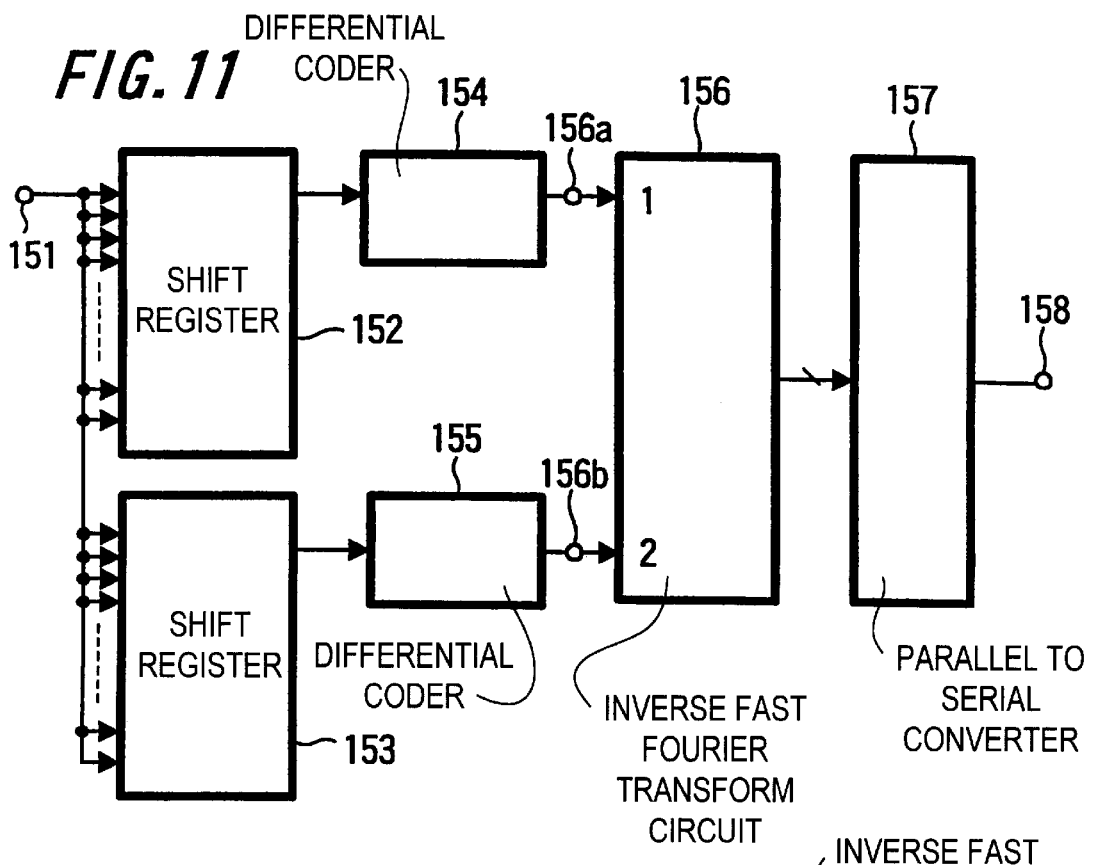
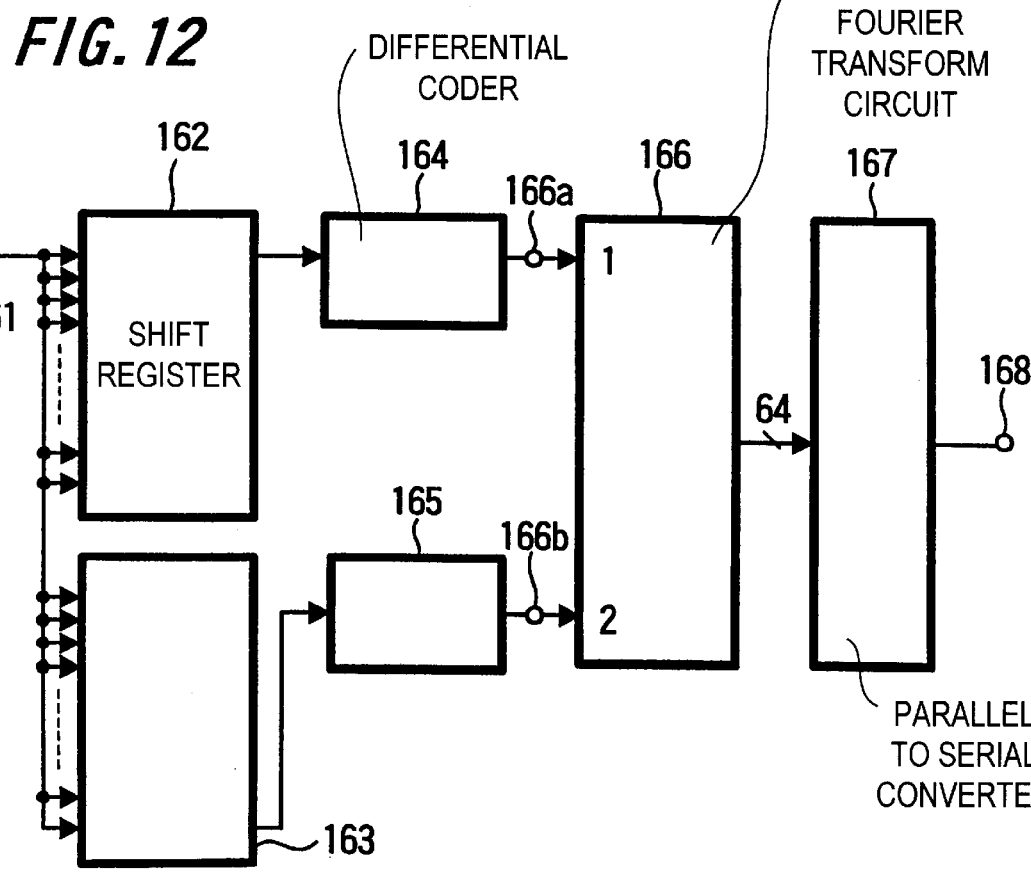

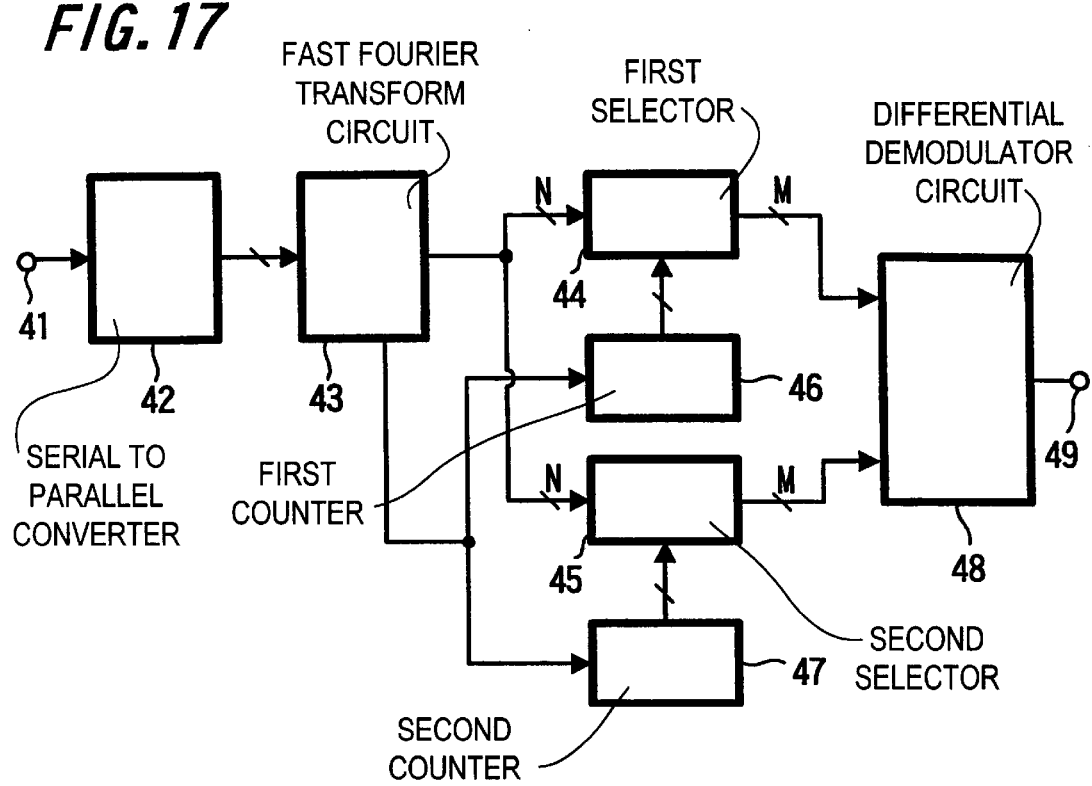
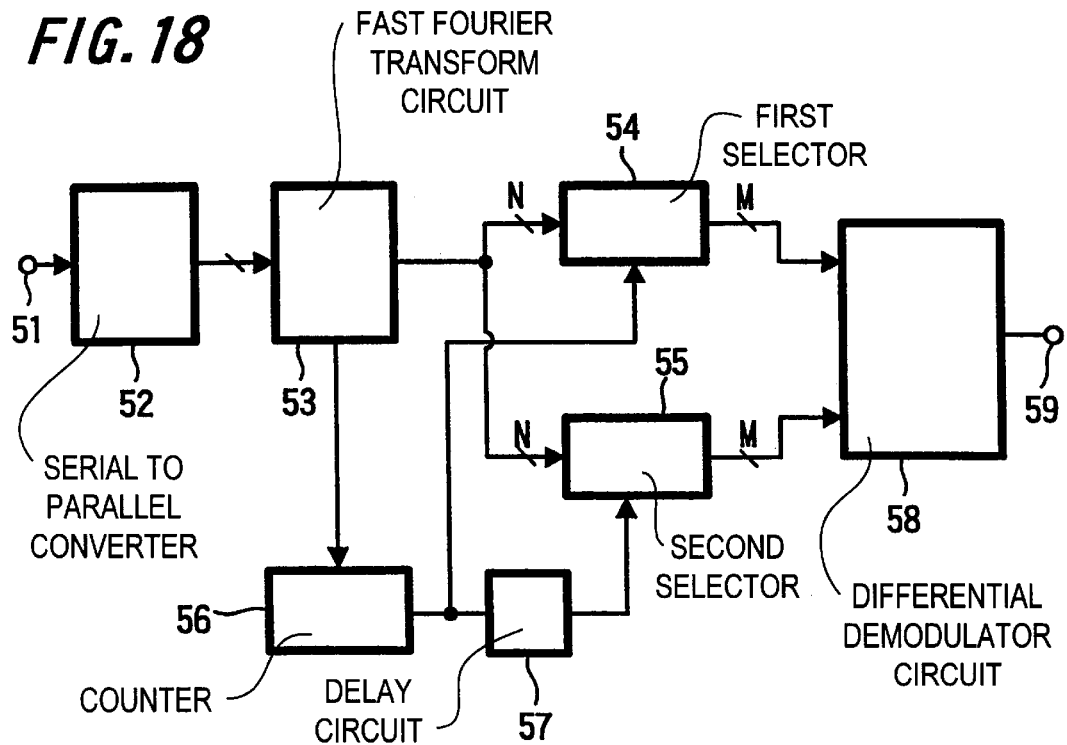

FIG. 31
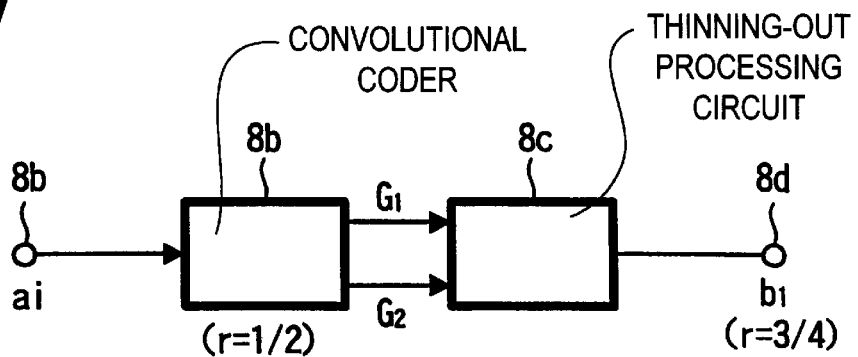
FIG. 32
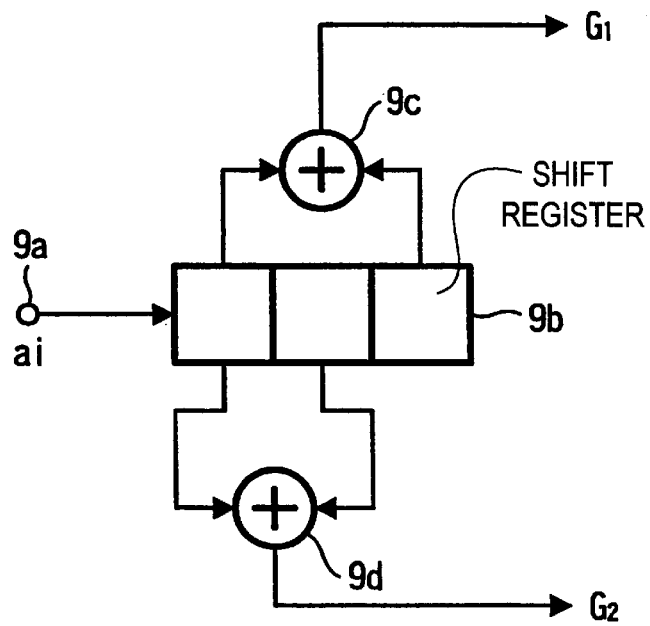
FIG. 33A  ai  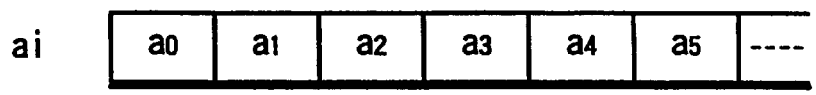
FIG. 33B  G1  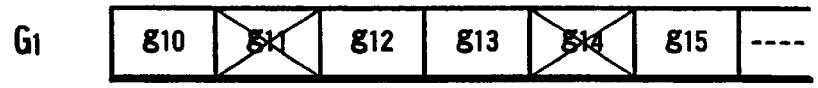
FIG. 33C  G2  
FIG. 33D  bi  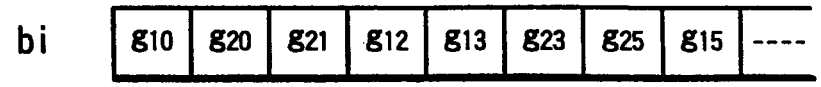

MODULATING METHOD, MODULATOR, DEMODULATING METHOD AND DEMODULATOR

TECHNICAL FIELD

The present invention relates to a modulating method for generating a signal modulated by orthogonal frequency division multiplexing (to be referred to as 'OFDM' hereinafter), a modulator utilizing the modulation method, a demodulating method for demodulating the OFDM-modulated signal and a demodulator utilizing the demodulation method. The present invention relates to, in particular, a technique suited for processing an interleaved OFDM modulation signal.

BACKGROUND ART

Conventionally, OFDM modulation has been put to practical use as one of modulation systems in case of radio-transmitting relatively mass storage digital data. As shown in, for example, FIG. 23, in a relatively small space such as a home or an office floor, a picture signal (digital picture data) outputted from a picture signal source 1 consisting of a tuner receiving television broadcasting, a reproducing apparatus for reproducing a picture program recorded in a recording medium and the like is supplied to a radio transmitter 2. The picture signal is modulated to an OFDM modulated signal at a radio transmitter 2 and the modulated signal is radio-transmitted from an antenna 3 in a predetermined frequency band. The radio-transmitted signal is received by a radio receiver 5 connected to an antenna 4. The received OFDM wave in the frequency band is demodulated and a picture signal is thereby obtained. The received picture signal is supplied to a video recording and reproducing apparatus 6, in which the signal is recorded in a predetermined recording medium such as a video tape, or supplied to an image receiving machine 7 and subjected to image receiving process. In this case, it is possible to reproduce the picture signal recorded in the video recording and reproducing apparatus 6 and to supply the resultant reproduced signal to the image receiving machine 7 to thereby allow an image to be received by the image receiving machine 7.

With this system arrangement, it is possible to highly efficiently radio-transmit mass storage digital data by using the OFDM modulated signal for radio transmission between the antenna 3 connected to the radio transmitter 2 and the antenna 4 connected to the radio receiver 5.

Now, with reference to FIG. 24 showing an example of the constitution of the radio transmitter 2 for conducting OFDM modulation for transmission, a transmission signal (digital data) obtained at an input terminal 2a is supplied to a serial/parallel converter 2b and converted to parallel data for each predetermined unit. The parallel data converted at the serial/parallel converter 2b is supplied to an interleave memory 2c in which interleave processing for changing write and read orders for writing and reading data to/from the memory 2c and changing data array. The interleaved parallel data is supplied to an inverse Fourier transform circuit (or IFFT circuit) 2d, in which time axis data is orthogonally transformed to frequency axis data by arithmetic operation by means of inverse fast Fourier transform. The orthogonally transformed parallel data is supplied to a parallel/serial converter 2e and converted to serial data, which serial data is supplied to an output terminal 2f. The data obtained at the output terminal 2f is supplied to a transmission processing system to convert the frequency to fall within the range of a predetermined transmission frequency band, thereafter radio-transmitting the data.

Next, with reference to FIG. 25 showing an example of a constitution in which the signal thus radio-transmitted is received and demodulated by the radio receiver 5, a signal in a predetermined frequency band is received and a signal frequency-converted to an intermediate frequency signal is obtained at the input terminal 5a. The data obtained at the input terminal 5a is supplied to a serial/parallel converter 5b and converted to parallel data for each predetermined unit. The converted output is supplied to a Fourier transform circuit (FFT circuit) 5c, in which orthogonal transform processing for transforming frequency axis data to time axis data by arithmetic operation by means of fast Fourier transform. The orthogonally transformed parallel data is supplied to a de-interleave memory 5d, in which de-interleave processing for changing write and read orders for writing and reading data to/from the memory 5d, changing data array back to an original data array is conducted. The de-interleaved parallel data is supplied to the parallel/serial converter 5e and converted to serial data, which serial data is supplied to the output terminal 5f.

The demodulation processing for demodulating the OFDM modulation signal conducted with the constitution shown in FIG. 25 is executed at timing shown in FIG. 26. That is to say, there are, first, a data input time Ta at which data is inputted to the Fourier transform circuit 5c, next a Fourier transform processing time Tb at which Fast Fourier transform is conducted at the Fourier transform circuit 5c and then a data output time Tc at which the Fourier-transformed data is outputted. The data outputted at the output time Tc is simultaneously written in the de-interleave memory 5d and the data written in the memory 5d is read at a read-out time Td. It is noted that transform processing for generating an OFDM modulation signal with the constitution of FIG. 24 is basically opposite to the demodulation processing and requires the same time as that for the demodulation processing.

Now, description will be given to a case where data is interleaved and transmitted by the transmission processings of FIGS. 24 and 25, with reference to FIGS. 27 and 28. As shown in FIG. 27A, for example, if OFDM modulation for distributing data in 50 units of data numbers of k=0 to 49 to sub-carriers $x_0$ to $x_{50}$ and transmitting them is conducted and this signal is correctly received by a receiver side, then no problem occurs. On the other hand, as shown in FIG. 27B, for example, it is assumed that sub-carriers of data numbers k=5, 6 and 7 cannot be correctly received due to multi-pass fading or the like and that the items of data numbered k=5, 6 and 7 are lost.

At this time, if data is transmitted without interleave processing, data items of three consecutive units in one slot, i.e., k=5, 6 and 7 are lost, resulting in burst error as shown in FIG. 28A. If such a burst error occurs, it is difficult to completely restore data using an error correction code. If data is transmitted after interleave processing, by contrast, data items of three units of k=5, 6 and 7 are arranged in a distributed manner in one slot (the distribution state varies according to interleave conditions) as shown in, for example, FIG. 28B. Then, a possible error becomes random errors, each of which can be completely corrected by using error correction codes or the like.

By transmitting data after subjecting the data to interleave processing, it is possible to minimize data loss at the receiver side and to ensure a good transmission condition.

Meanwhile, with the constitution shown in FIG. 25, interleave processing is conducted using a memory. There is also proposed a constitution in which de-interleave processing is conducted without using a memory. FIG. 29 shows an example of the latter case. Processing steps shown therein are the same until data obtained at an input terminal 5a is supplied to a serial/parallel converter 5b and converted to parallel data for each predetermined unit, and the conversion output is supplied to a Fourier transform circuit 5c, in which orthogonal transform for transforming frequency axis data to time axis data is conducted by arithmetic operation by means of Fast Fourier transform. The orthogonally transformed parallel data is subjected to processing for changing a data array by wiring change processing 5d corresponding to the interleave pattern of the data. The parallel data which data array has been thus changed is supplied to a parallel/serial converter 5e and converted to serial data. The serial data is then supplied to an output terminal 5f.

The demodulation processing for demodulating an OFDM modulation signal conducted with the constitution shown in FIG. 29 is executed at timing shown in FIG. 30. That is to say, there are, first, a data input time Te at which data is inputted to the Fourier transform circuit 5c, next a Fourier transform processing time Tf at which fast Fourier transform is conducted at the Fourier transform circuit 5c, and then an output time Tg at which the data thus Fourier-transformed is outputted. With this constitution, the data is outputted from the Fourier transform circuit 5c and supplied to the parallel/serial converter 5e and, at the same time, de-interleaved by wiring change processing.

If a convolutionally coded signal is modulated to an OFDM modulation signal, thinning-out processing called puncture, processing is sometimes conducted. FIG. 31 shows an example of a conventional constitution with which this puncture processing is conducted. Transmission data $a_i$ obtained at an input terminal 8a is convolutionally coded by a convolutional coder 8b and two sets of data $G_1$ and $G_2$ are generated. The two data sets $G_1$ and $G_2$ are supplied to a thinning-out processing circuit 8c and thinned out, and coded data $b_i$ which has been subjected to puncture processing is thereby obtained. Here, it is assumed that if the coding rate of the convolutional coder 8b is r=½, a coding rate at which the puncture-processed data bi is coded is r=¾. An example of the constitution of the convolutional coder with a coding rate of r=½ is shown in FIG. 33. In FIG. 33, transmission data $a_i$ obtained at the input terminal 9a is supplied to a shift register 9b. The shift register 9b consists of three stages, in which data stored in the first stage and that in the third stage are supplied to and added together by an adder 9c and data $G_1$ is thereby obtained and in which data stored in the first stage and that in the second stage are supplied to and added together by an adder 9d and data $G_2$ is thereby obtained.

The thinning-out processing state of the two data sets of $G_1$ and $G_2$ thus convolutionally coded is shown in FIG. 33. If a data sequence of $a_0, a_1, a_2 \ldots$ shown in, for example, FIG. 33A forms input data ai, two data sets $G_1$ and $G_2$ which have been convolutionally coded become data $g_{10}, g_{11}, g_{12}, \ldots$ and data $g_{20}, g_{21}, g_{22}, \ldots$ as shown in FIGS. 33B and 33C, respectively. At a thinning-out processing circuit 8c, using, for example, data $g_{10}, g_{11}, g_{12}, g_{20}, g_{21}$ and $g_{22}$, the data are outputted in the order of $g_{10}, g_{20}, g_{21},$ and $g_{12}$ as shown in FIG. 33D. Namely, as indicated by x marks shown in FIGS. 33B and 33C, data $g_{11}$ and $g_{22}$ are thinned out. The data $b_i$ thus thinned out eventually becomes data convolutionally coded at a coding rate of r=¾.

In modulation processing for modulating an OFDM modulation signal, if interleave processing is conducted using a memory as shown in FIG. 24, a modulation processing constitution is disadvantageously complicated because of the need of the memory. Also, the modulation processing time is disadvantageously longer than that for a case where data which is not interleaved is processed by the time required for reading data from the interleave memory.

Further, if puncture processing using the convolutional coder shown in FIG. 31 is conducted during modulation, the constitution for puncture processing is disadvantageously complicated. That is, as can be seen from FIG. 33 showing a puncture processing state, the clock rate of input data (FIG. 33A) is not an integral multiple of that of puncture-processed output data (FIG. 33B). A clock of two-thirds of a data clock is required for thinning-out processing and the generation of such clocks tends to make constitution complex. Besides, it also requires processing for re-timing the thinned-out data, which makes a relevant circuit larger in size and it requires high power consumption. In addition, since clocks with different frequencies are used, spurious radiation occurs and it adversely affects a high frequency circuit block in which modulation signals are radio-transmitted or received. The adverse influences involve, for example, the deterioration of reception characteristics and the occurrence of emission interference of the out-side spurious wave.

Moreover, in case of demodulating an OFDM modulation signal and conducting de-interleave processing using a memory as shown in FIG. 25, the demodulation processing constitution is disadvantageously complicated because of the need of the memory. As for demodulation processing time, the processing time $T_1$ shown in FIG. 26 includes longer demodulation processing time than that in a case of processing data which is not interleaved, by the time required for reading data from the de-interleave memory. Thus, demodulation processing disadvantageously is lengthened.

As shown in FIG. 29, if de-interleave processing is conducted at processing for changing the wiring of parallel data outputted from the Fourier transform circuit, a processing time T2 shown in FIG. 30 is the same as that for dealing with data which is not interleaved, in which case the problem of lengthened processing time does not occur. Still, due to the need to provide a parallel/serial converter 5e at the output part, a circuit board in which a demodulator circuit for OFDM modulation signals is incorporated is disadvantageously made larger in size.

DISCLOSURE OF THE INVENTION

It is the first object of the present invention to make it possible to realize modulation processing for generating an interleaved OFDM modulation signal with a simple constitution at a short processing time.

It is the second object of the present invention to make it possible to realize processing for demodulating an interleaved OFDM modulation signal with simple constitution in a short processing time.

The first invention is a modulation method characterized by comprising the steps of retaining predetermined data as N sets of data, where N is an arbitrary integer; and sequentially outputting the retained N data sets in an order indicated by predetermined output order data and transforming the outputted N data to data arranged on a frequency axis in a distributed manner at predetermined frequency intervals. This makes it possible to interleave the data in an order in which the data are supplied to conduct inverse Fourier transform and to simplify processing for interleave processing. In addition, it take no time to conduct interleave processing. Thus, time required for transform processing can be reduced.

The second present invention according to the first invention, i.e., the modulation method, is characterized in that the output order data is generated by count processing. This makes it possible to easily generate signal order data by count processing and to conduct interleave processing.

The third invention according to the first invention, i.e., the modulation method, is characterized in that the output order data causes data prepared in advance to be sequentially outputted. This makes it possible to conduct interleave processing by simple processing for preparing output order data in advance.

The fourth invention according to the first invention, i.e., the modulation method, is characterized by comprising the steps of delaying one set of data out of the two sets of data generated by convolutional coding by a one-clock time of the data; and sequentially outputting the delayed set of data and undelayed set of data in the order indicated by the predetermined output order data, and transforming the outputted data to data arranged on the frequency axis in a distributed manner at predetermined frequency intervals. This makes it possible to efficiently interleave convolutionally coded data to an OFDM modulation signal by simple processing.

The fifth invention according to the first invention, i.e., the modulation method, is characterized by comprising the step of parallel processing data of Q-bit words as processing for transforming the data of Q-bit words to the data arranged on the frequency axis in a distributed manner at the predetermined frequency intervals, where Q is an integer equal to or higher than 2. This makes it possible to efficiently process data in units of words consisting of a plurality of bits.

The sixth invention is a modulation method characterized by comprising the steps of generating first interleaved data and second interleaved data from predetermined data; and while simultaneously using the first and second interleaved data, transforming the first and second interleaved data to data arranged on a frequency axis in a distributed manner at predetermined frequency intervals. This makes it possible to inversely Fourier-transform the interleaved data in a short time to thereby reduce modulation processing time.

The seventh invention according to the sixth invention, i.e., the modulation method, is characterized by comprising the steps of differentially coding the first and second interleaved data irrespectively of each other; and while simultaneously using the respective differentially coded data, transforming the differentially coded data to data arranged on the frequency axis in a distributed manner at predetermined frequency intervals. This makes it possible to efficiently conduct differential coding during interleave processing.

The eighth invention is a modulator characterized by comprising N registers to which predetermined data is simultaneously supplied, where N is an arbitrary integer; output order data generating means for generating data for designating an output order of the data supplied to the N registers; and inverse Fourier transform means for transforming the supplied N data to data arranged on a frequency axis in a distributed manner at predetermined frequency intervals in the order designated by the output order data generating means. This makes it possible to interleave data at the time the data is inputted to the inverse Fourier transform means. As a result, there is no need to provide a large circuit such as a memory for interleave processing and the interleave processing is conducted simultaneously with input selection. Thus, modulation processing time is not lengthened since interleave processing time is not added to the modulation processing time.

The ninth invention according to the eighth invention, i.e., the modulator, is characterized in that a counter sequentially generating data corresponding to the output order by means of count processing is employed as the output order data generating means. Thus, by generating the output order data by the count processing of the counter, it is possible to easily generate signal order data using the counter and to conduct interleave processing.

The tenth invention according to the eighth invention, i.e., the modulator, is characterized in that a shift register sequentially outputting data prepared in advance is employed as the output order data generating means. This makes it possible to conduct interleave processing with simple constitution in which the shift register is employed.

The eleventh invention according to the eighth invention, i.e., the modulator, is characterized by comprising: convolutional coding means; delay means for delaying one set of data out of two sets of data coded by the convolutional coding means by a one-clock time of the data; and hold means for temporarily holding the output order data outputted by the output order data generating means, and characterized in that one set of data delayed by the delay means and the other set of data outputted by the convolutional coding means are supplied to the register. This makes it possible to efficiently interleave the convolutionally coded data to an OFDM modulation signal with simple constitution.

The twelfth invention according to the eighth invention, i.e., the modulator, is characterized in that the inverse Fourier transform means parallel-processes data of Q-bit words, where Q is an integer equal to or higher than 2. This makes it possible to efficiently process data in units of words consisting of plural bits with simple constitution.

The 13th invention is a modulator characterized by comprising first and second interleave means for interleaving predetermined data; and inverse Fourier transform means for inputting data outputted from the first and second interleave means to different points and transforming the outputted data to data arranged on a frequency axis in a distributed manner at predetermined frequency intervals. This makes it possible to input the interleaved data to the inverse Fourier transform means and process them in a short time.

The 14th invention according to the 13th invention, i.e., the modulator, is characterized by comprising first differential coding means for differentially coding an output of the first interleave means; and second differential coding means for differentially coding an output of the second interleave means, and characterized in that coded outputs of the first and second differential coding means are supplied to the inverse Fourier transform means. Thus, it is possible to differentially code and inversely Fourier-transform the interleaved data efficiently.

The 15th invention is a demodulation method characterized by comprising the steps of transforming data arranged on a frequency axis in a distributed manner at predetermined frequency intervals to N points of data for every predetermined unit; and selecting and outputting points of data designated by predetermined output order data from the transformed N points of data. This makes it possible to conduct de-interleave processing during processing for selecting data to be outputted from the Fourier-transformed data. Thus, processing for de-interleave processing is simplified and does not require any additional time, whereby time required for demodulation processing can be reduced.

The 16th invention according to the 15th invention, i.e., the demodulation method, is characterized in that the output order data is sequentially generated by count processing. This makes it possible to easily generate signal order data by count processing and to conduct de-interleave processing.

The 17th invention according to the 15th invention, i.e., the demodulation method, is characterized in that the output order data causes data prepared in advance to be sequentially outputted. This makes it possible to conduct de-interleave processing by simple processing for preparing output order data in advance.

The 18th invention according to the 15th invention, i.e., the demodulation method, is characterized by comprising the step of dividing the transformed N points of data to two sets of data, and selecting and outputting points from the two sets of data based on the output order data irrespectively of each other. This makes it possible to simultaneously obtain plural sets of demodulation data.

The 19th invention according to the 18th invention, i.e., the demodulation method, is characterized by comprising the step of conducting differential demodulation using the two sets of data which points are selected and outputted irrespectively of each other. This makes it possible to easily conduct good differential demodulation processing.

The 20th invention according to 19th invention, i.e., the demodulation method, is characterized by comprising the step of delaying one set of data out of the two sets of data, which points are selected and outputted respectively, by a predetermined time. This makes it possible to conduct appropriate selection processing.

The 21st invention according to the 18th invention, i.e., the demodulation method, is characterized by comprising the step of conducting Viterbi decoding using the two sets of data which points are selected and outputted irrespectively of each other. This makes it possible to conduct good Viterbi decoding.

The 22nd invention according to 15th invention, i.e., the demodulation method, is characterized by comprising the steps of dividing the transformed N points of data to four sets of data and individually selecting and outputting points from the four sets of data based on the output order data; conducting differentially demodulation using selected first set of data and second set of data; conducting differentially demodulation using selected third set of data and fourth set of data; and conducting Viterbi decoding using the respective differentially demodulated data. This makes it possible to conduct differential demodulation using Fourier-transformed N points of data and conduct Viterbi decoding using the differentially demodulated data. Thus, good demodulation data can be obtained as a result of differential demodulation and Viterbi decoding.

The 23rd invention according to 22nd invention, i.e., the demodulation method, is characterized by comprising the steps of preparing first and second output order data as the output order data; selecting the first set of data based on the first output order data; selecting the second set of data based on data delayed by a predetermined time from the first output order data; selecting the third set of data based on the second output order data; and selecting the fourth set of data based on data delayed by a predetermined time from the second output order data. Thus, by generating two output order data, it is possible to individually select points using four sets of data and to thereby conduct good processing using only two output order data.

The 24th invention according to the 22nd invention, i.e., demodulation method, is characterized by comprising the step of designating selected points of the four sets of data based on the output order data respectively generated. This makes it possible to conduct appropriate processing for every set of data.

The 25th invention according to the 22nd invention, i.e., demodulation method, is characterized by comprising the steps of selecting the third set of data based on predetermined output order data; selecting the fourth set of data based on data delayed by a predetermined time from the predetermined output order data; selecting the first set of data based on data obtained by adding a predetermined value to the predetermined output order data; and selecting the second set of data based on data delayed by a predetermined time from the data obtained by adding the predetermined value to the predetermined output order data. Thus, by processing one output order data to provide data for selecting four sets of data, it is possible to conduct Viterbi decoding based on the two differentially demodulated data with simple constitution.

The 26th invention is a demodulator characterized by comprising Fourier transform means for transforming data arranged on a frequency axis in a distributed manner at predetermined frequency intervals to N points of data for every unit, where N is an arbitrary integer; selecting means for selecting and outputting designated points of data from the N points of data outputted by the Fourier transform means; and output order data generating means for generating data for designating points selected by the selecting means. Thus, de-interleave processing is conducted while selecting data to be outputted from the Fourier-transformed data using selecting means. As a result, there is no need to provide a memory storing Fourier-transformed data or the like and a large circuit such as an output parallel/serial converter. Besides, since de-interleave processing is conducted simultaneously with the selection of outputted data, demodulation processing is not lengthened since it is not necessary to add time for conducting de-interleave processing to the demodulation processing.

The 27th invention according to the 26th invention, i.e., the demodulator, is characterized in that a counter sequentially generating data corresponding to an output order by means of count processing is employed as the output order data generating means. This makes it possible to conduct appropriate de-interleave processing with simple constitution in which a counter is used.

The 28th invention according to the 26th invention, i.e., the demodulator, is characterized in that a shift register sequentially outputting data prepared in advance is employed as the output order data generating means. This makes it possible to conduct appropriate de-interleave processing with simple constitution in which a shift register is used.

The 29th invention according to the 26th invention, i.e., the demodulator, is characterized in that the N points of data outputted by the Fourier transform means are supplied to first and second selecting means to cause the first and second selecting means to individually select and output points based on an output of the output order data generating means. This facilitates simultaneously obtaining plural sets of demodulation data.

The 30th invention according to the 29th invention, i.e., the demodulator, is characterized by comprising differential demodulation means, to which the points of data selected by the first selecting means and the points of data selected by the second selecting means are supplied, for conducting differential demodulation using the two sets of data. This makes it possible to conduct good differential demodulation processing with simple constitution.

The 31st invention according to the 30th invention, i.e., the demodulator, is characterized in that an output of the output order data generating means is directly supplied to the first selecting means and to the second selecting means through delay means for delaying the output of the output order data generating means by a predetermined time. This makes it possible to conduct appropriate selection processing using two selection means with simple constitution in which only one output order data generating means is used.

The 32nd invention according to the 29th invention, i.e., the demodulator, is characterized by comprising Viterbi decoding means, to which the points of data selected by the first selecting means and the points of data selected by the second selecting means are supplied, for conducting Viterbi decoding using the two sets of data. This makes it possible to conduct good Viterbi decoding using plural sets of demodulation data obtained with simple constitution.

The 33rd invention according to the 26th invention, i.e., the demodulator, is characterized in that the N points of data outputted by the Fourier transform means are supplied to first, second, third and fourth selecting means, and the selecting means individually select points based on an output of the output order data generating means; points of data selected by the first and second selecting means are supplied to and differentially demodulated by a first differential demodulation means; points of data selected by the third and fourth selecting means are supplied to and differentially demodulated by second differential demodulation means; and the data differentially demodulated by the first and second differential demodulating means are supplied to and Viterbi decoded by Viterbi decoding means. This makes it possible to conduct good Viterbi decoding based on the two differentially demodulated data.

The 34th invention according to the 33rd invention, i.e., the demodulator, is characterized in that the demodulator comprises first and second output order data generating means as the output order data generating means; and an output of the first output order data generating means is directly supplied to the first selecting means and supplied to the second selecting means through delay means for delaying the output of the first output order data generating means by a predetermined time, and an output of the second output order data generating means is directly supplied to the third selecting means and supplied to the fourth selecting means through delay means for delaying the output of the second output order data generating means by a predetermined time. This makes it possible to individually select points of data using four selecting means with simple constitution.

The 35th invention according to the 33rd invention, i.e., the demodulator, is characterized in that data for designating the points selected by the first, second, third and fourth selecting means are supplied from individual output order data generating means for the first, second, third and fourth selecting means respectively. This facilitates setting an optimal selection state for each selecting means.

The 36th invention according to the 33rd invention, i.e., the demodulator, is characterized in that an output of the output order data generating means is directly supplied to the third selecting means and supplied to the fourth selecting means through first delay means for delaying the output of the output order data generating means by a predetermined time, and an output of arithmetic operation means for adding a predetermined value to the output of the output order data generating means, is directly supplied to the first selecting means and supplied to the second selecting means through second delay means for delaying the output of the arithmetic operation means by a predetermined time. This makes it possible to conduct Viterbi decoding based on the two differentially demodulated date with simple constitution in which only one output order data generating means is used.

BRIEF DESCRIPTION OF DRAWINGS

FIG. 3 is a frequency spectrum view showing an example of a frequency spectrum processed by the present invention;

FIG. 4 is a timing view showing a modulation processing state in the first embodiment according to the present invention;

FIG. 6 is a block diagram showing an example of a constitution in the third embodiment according to the present invention;

FIG. 7 is a timing view showing a processing state in the third embodiment according to the present invention;

FIG. 11 is a block diagram showing an example of a constitution in the sixth embodiment according to the present invention;

FIG. 12 is a block diagram showing an example of a constitution in the seventh embodiment according to the present invention;

FIG. 17 is a block diagram showing an example of a constitution in the eleventh embodiment according to the present invention;

FIG. 18 is a block diagram showing an example of a constitution in the twelfth embodiment according to the present invention;

FIG. 31 is a block diagram showing an example of a conventional constitution for puncture processing;

FIG. 32 is a block diagram showing an example of a convolutional coder; and

FIG. 33 is a timing view showing an example of a conventional puncture processing state.

BEST MODE FOR CARRYING OUT THE INVENTION

Now, the first embodiment according to the present invention will be described with reference to FIGS. 1 through 4.

Figure 1:
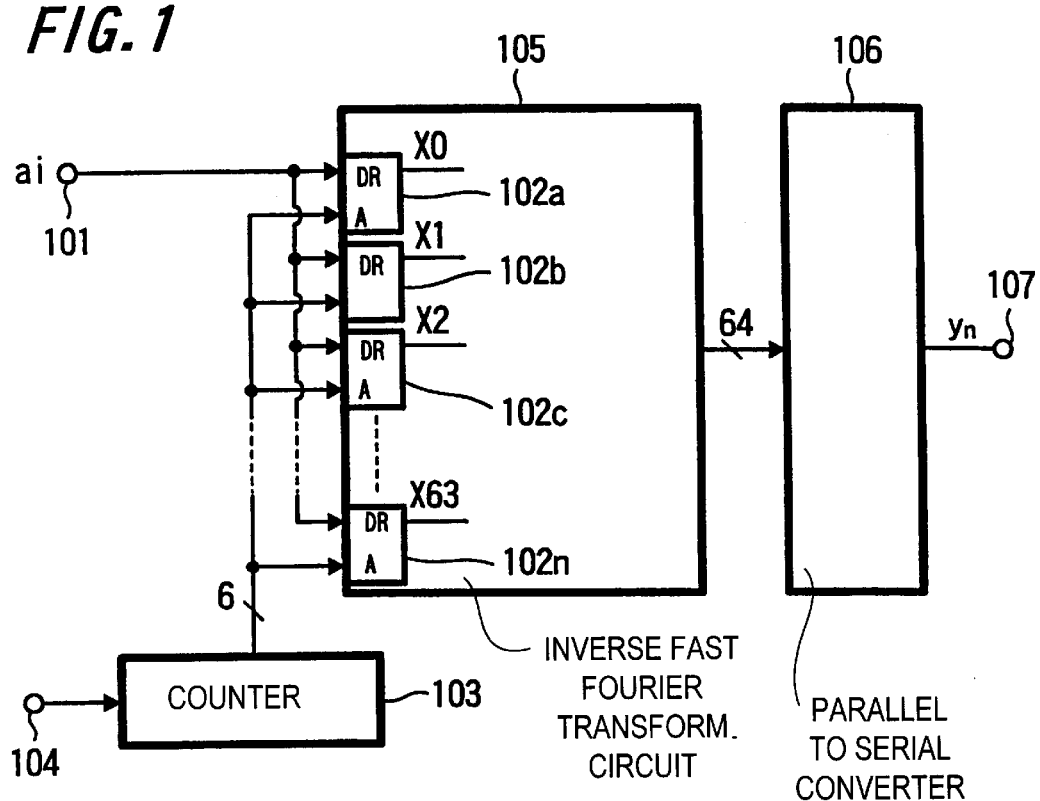
FIG. 1 is a block diagram showing an example of a constitution in the first embodiment according to the present invention.

In this embodiment, the present invention is applied to a modulator part in a transmitter for radio-transmitting an OFDM modulation signal. An OFDM modulation signal to be transmitted is interleaved. FIG. 1 shows the constitution of the modulator part in this embodiment. Transmission data $a_i$ such as a base band signal is supplied to an input terminal 101. The transmission data $a_i$ obtained at the input terminal 101 is interleaved and OFDM modulated.

Here in this embodiment, the transmission data $a_i$ obtained at the input terminal 101 is supplied to N registers 102a, 102b, . . . 102n (where N is 64 in this case). The N registers 102a to 102n are formed as address decoder added registers. The constitution of an address decoder added register will be described later. The outputs of the 64 address decoder added registers 102a to 102n are supplied to an inverse Fourier transform circuit (IFFT circuit) 105.

This inverse Fourier transform circuit 105 is a circuit conducting orthogonal transform processing for transforming and then modulating time axis data to frequency axis data by arithmetic operation by means of inverse Fourier transform. In this case, an inverse Fourier transform circuit for conducting N-point transform processing (where N is 64) is employed. The transformed data is outputted as N-bit (64-bit) parallel data. The parallel data outputted from this inverse Fourier transform circuit 105 is supplied to a parallel/serial converter 106 to thereby convert the parallel data to serial data. The serial data is supplied to an output terminal 107 as OFDM-modulated data $y_n$. The OFDM-modulated data $y_n$ obtained at the output terminal 107 is supplied to a high frequency circuit (not shown) in which the data $y_n$ is subjected to transmission processing.

If the number of transform points of the inverse Fourier transform circuit 105 is 64, a transform expression for inverse Transform processing is shown as the following Expression [1]:

$$y_n = \sum_{k=0}^{63} x_k e^{j2\pi kn/64}$$ Expression [1]

Figure 2:
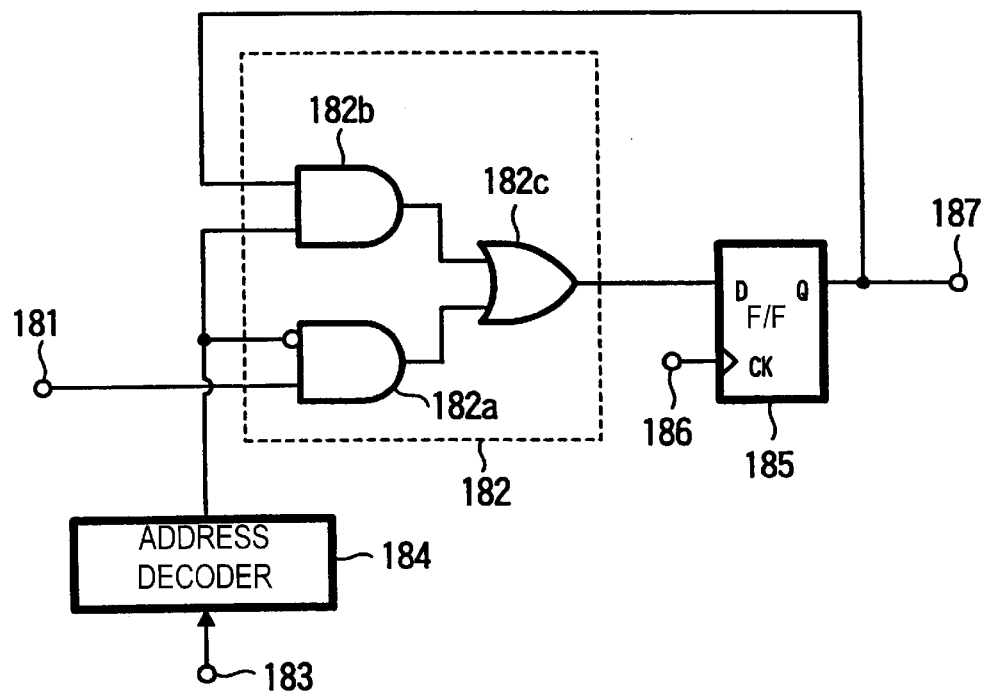
FIG. 2 is a block diagram showing the constitution of a register in the first embodiment according to the present invention.

Each of the 64 address decoder added registers 102a to 102n arranged at the input part of the inverse Fourier transform circuit 105 is constituted as shown in, for example, FIG. 2. Namely, the data obtained at the input terminal 181 is supplied to a selector 182. The selector 182 consists of two AND gates 182a and 182b and one OR gate 182c. The address decoder 184 decodes address data supplied from the counter to an address input terminal 183. Based on the decoded output, the selector 182 selects data among those obtained at the input terminal 181. The data selected by the selector 182 is supplied to and latched by a D flip-flop 185 and the latched data is supplied to an output terminal 187. A clock input terminal CK of the D flip-flop 185 is supplied with clocks from a clock input terminal 186.

If the address decoder 184 detects an input from the terminal 183 of an address set in the decoder 184, inputted data is loaded based on the detection signal. If not, data is retained as it is. Here, the N address decoder added registers 102a to 102n are allotted different addresses. Due to this, the registers 102a to 102n conduct processing for outputting data set at different timing, respectively.

Back to the description of FIG. 1, 6-bit address data from a counter 103 is supplied to the address decoders of the N address decoder added registers 102a to 102n, respectively. The counter 103 is a circuit generating address data for designating the N (64 in this case) registers 102a to 102n in a predetermined order by means of count processing. In this embodiment, the counter 103 is constituted to generate data for sequentially designating the respective addresses in an order corresponding to the interleave pattern of the transmitted OFDM modulation signal.

Here, a counter which generates 6-bit data from 0 to 63 is employed. The counter conducts count processing to generate 0, 5, 10, 15 . . . 58, 63 in the order shown in Table 1 below. It is noted that every time one unit of transform processing is conducted at the inverse Fourier transform circuit 105, a start pulse is supplied from modulation processing control means (not shown) to the counter 103 through a terminal 104. Upon supplied with the start pulse, the counter 103 starts count processing. Additionally, in this example described herein, values from 25 to 38 are not counted.

TABLE 1

| 0→ | 5→ | 10→ | 15→ | 20→ | 39→ | 44→ | 49→ | 54→ | 59 |
|---|---|---|---|---|---|---|---|---|---|
| 1→ | 6→ | 11→ | 16→ | 21→ | 40→ | 45→ | 50→ | 55→ | 60 |
| 2→ | 7→ | 12→ | 17→ | 22→ | 41→ | 46→ | 51→ | 56→ | 61 |
| 3→ | 8→ | 13→ | 18→ | 23→ | 42→ | 47→ | 52→ | 57→ | 62 |
| 4→ | 9→ | 14→ | 19→ | 24→ | 43→ | 48→ | 53→ | 58→ | 63 |

If the transform processing is conducted as shown above, OFDM modulation signals having a frequency spectrum shown in FIG. 3A are obtained. That is to say, data $\{X_k\}$ inputted to the Fourier transform circuit 105 are data of n=0 to 24 and n=39 to 63 arranged on a frequency axis at certain intervals. In the frequency spectrum shown in FIG. 3A, data are divided into two groups. The frequency spectrum is equivalent to a continuous spectrum centered around k=0 as shown in FIG. 3B.

FIG. 4 is a timing view showing a modulation processing state in the circuit in this embodiment, which description will be given hereinafter. First, there is an input time Th at which the data obtained at the input terminal 101 is set to the registers 102a to 102n and inputted to the inverse Fourier transform circuit 105. Next, theres occur an inverse Fourier transform processing time Ti at which fast inverse Fourier transform is conducted at the inverse Fourier transform circuit 105, and an output time Tg at which the inverse Fourier transformed data is outputted and converted from parallel to serial data. In this embodiment, the data is interleaved by input processing for inputting data to the inverse Fourier transform circuit 105 using the registers 102a to 102n at the input time Th.

With the constitution of this embodiment in which processing is carried out as described above, at the time of generating an OFDM modulation signal at the inverse Fourier transform circuit 105, interleave processing is conducted while data is being inputted to the inverse Fourier transform circuit 105. Thus, there is no need to provide a memory for interleave processing as done in the conventional case and it is possible to carry out interleave processing during OFDM modulation with a simple constitution and to simplify the constitution for generating an interleaved OFDM modulation signal. As for processing time for generating an OFDM modulation signal, the processing time T3 shown in FIG. 4 does not include excessive time for interleave processing. Thus, compared with the conventional case in which interleave processing is conducted using a memory, it does not require time for reading data from the memory, by which degree processing time can be shortened. To be specific, if it is assumed that 64-point modulation processing is conducted at the inverse Fourier transform circuit, time or processing time corresponding to the 64-clock period for input data can be shortened.

Figure 5:
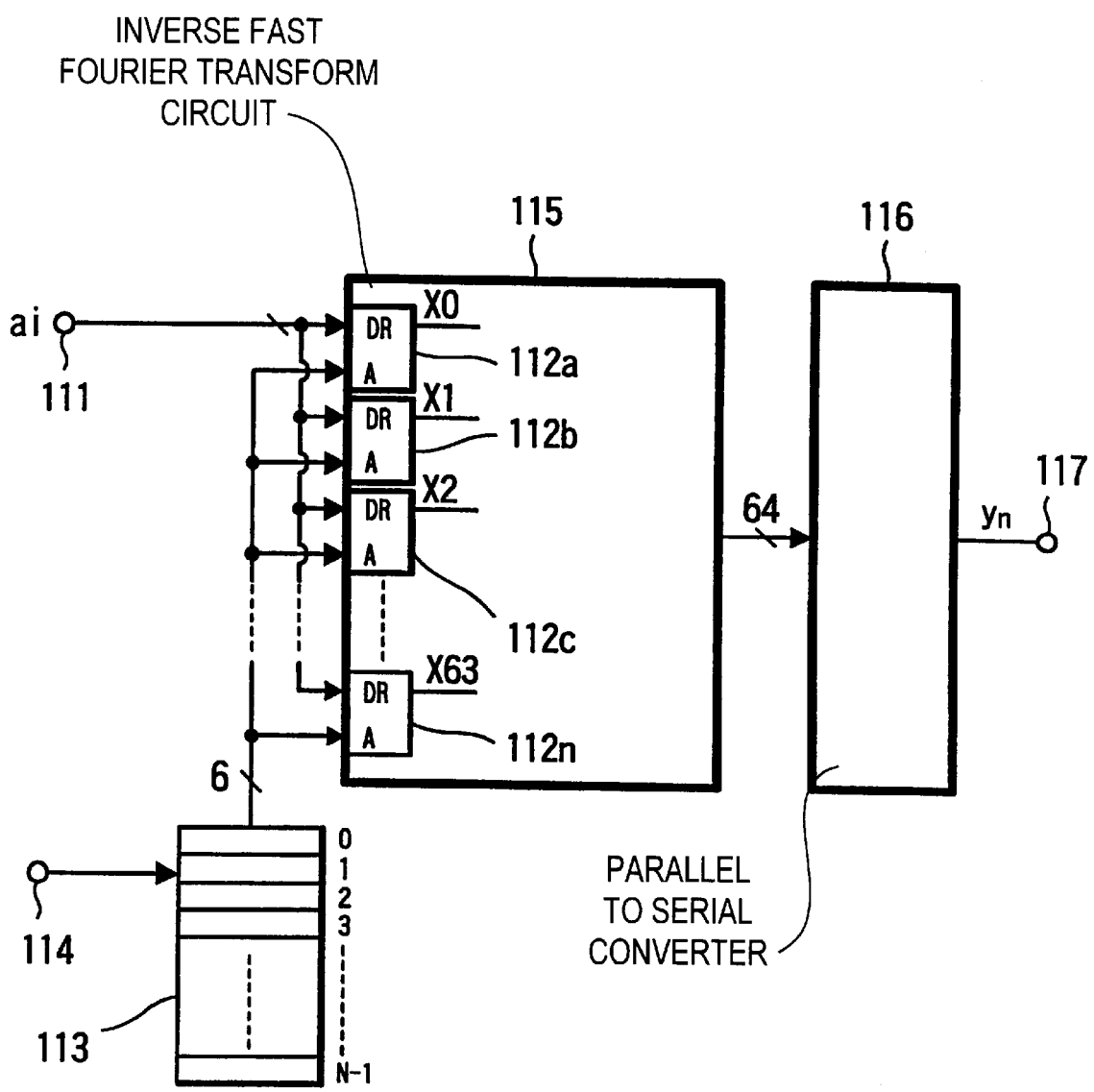
FIG. 5 is a block diagram showing an example of a constitution in the second embodiment according to the present invention.

Next, the second embodiment according to the present invention will be described with reference to FIG. 5. In the second embodiment as in the case of the first embodiment described above, the present invention is applied to a modulator part in a transmitter radio-transmitting an OFDM modulation signal. An OFDM modulation signal to be transmitted is interleaved. FIG. 5 shows the constitution of the modulator part in this embodiment. In FIG. 5, transmission data $a_i$ such as a base band signal is supplied to an input terminal 111. The transmission data $a_i$ obtained at the input terminal 111 is interleaved and OFDM modulated.

In this embodiment, the transmission data ai obtained at the input terminal 111 is supplied to N registers 112a, 112b, . . . 112n (where N is 64 in this case). The N registers 112a to 112n are formed as address decoder added registers each of which has the same constitution as that of the address decoder added register shown in FIG. 2. The address decoders are allotted different addresses.

The address data supplied to the address decoder added registers 112a to 112n are supplied from a shift register 113. N address data are set to the shift register 113 in a predetermined order (an interleave order) in advance. With a start pulse supplied from modulation processing control means (not shown) through a terminal 114, the output of address data starts in the order. If the address data thus set are supplied to the address decoder added registers 112a to 112n, respectively, the set transmission data $a_i$ is outputted. In this embodiment, outputs of 64 address decoder added registers 112a to 112n are supplied to an inverse Fourier transform circuit (IFFT circuit) 115.

The inverse Fourier transform circuit 115 is a circuit conducting orthogonal transform processing for transforming and then modulating time axis data to frequency axis data by arithmetic operation by means of inverse Fourier transform. In this embodiment, an inverse Fourier transform circuit which conducts N-point (64 points in this case) transform processing is employed and transformed data is outputted as N-bit (64-bit) parallel data. The parallel data outputted from the inverse Fourier transform circuit 115 is supplied to a parallel/serial converter 116 and converted to serial data. The serial data is supplied to an output terminal 117 as OFDM-modulated data $y_n$. The OFDM-modulated data $y_n$ obtained at the output terminal 117 is supplied to a high frequency circuit (not shown) in which the data $y_n$ is subjected to transmission processing.

The remaining constitution is the same as that described in the first embodiment above. The transform processing of the Fourier transform circuit 115 is exactly the same as that of the Fourier transform circuit 105 described in the first embodiment.

In the case of the constitution in the second embodiment, a shift register is used as output order data generation means. Owing to this, it is possible to carry out interleave processing in the order in which data is stored in the shift register. Also, even if the interleave pattern is complex, the interleave processing can be easily carried out by making data set to the shift register data corresponding to the interleave pattern.

The third embodiment according to the present invention will be described with reference to FIGS. 6 and 7. In the third embodiment as in the case of the preceding first and second embodiments, the present invention is applied to a modulator part in a transmitter radio-transmitting an OFDM modulation signal. An OFDM modulation signal to be transmitted is interleaved. FIG. 6 shows the constitution of the modulator part in this embodiment. As shown, transmission data $a_i$ such as a base band signal is supplied to an input terminal 121. The transmission data ai obtained at the input terminal 121 is interleaved and OFDM modulated. Further, in this embodiment, during the interleave processing, convolutionally coded data is also subjected to puncture processing. The constitution of the processing will be described hereinafter. It is assumed that the transmission data $a_i$ obtained at the input terminal 121 are two data sets convolutionally coded by a convolutional coder 122. One data set out of the two data sets is delayed by a one clock by a delay circuit 123. The delayed data set and the data set which is not delayed are supplied to N (or 64 in this case) registers 124a, 124b, . . . 124n. The convolutional coder 122 carries out coding processing at a coding rate of, for example, r=½. The N registers 124a to 124n are formed as address decoder added registers. Each of the registers is basically the same in constitution as the address decoder added register shown in FIG. 2. Different addresses are set to the registers. Compared with the registers shown in FIG. 2 in which one-bit data is set to respective registers, 2-bit data is set to the registers 124a to 124n in this embodiment.

The address data are supplied to the address decoder added registers 124a to 124n from a counter 125. The counter 125 is provided as means for generating data for designating an interleave order. The counter 125 counts address data corresponding to an interleave pattern and supplies address data to the registers 124a to 124n, respectively. The count of the counter 125 is started by a start pulse supplied from modulation processing control means (not shown) through a terminal 127. In this embodiment, a hold controller 126 for temporarily holding the count processing of the counter 125 is also provided. Hold timing is set by a start pulse supplied through the terminal 127. The hold operation is periodically conducted. For example, during the two-clock time for input data, the counter 125 continuously carries out count operation and thereafter processing for holding a count value for one clock. The hold controller of this type may be formed of, for example, a ternary counter.

The outputs of 64 address decoder added registers 124a to 124n thus controlled are supplied to an inverse Fourier transform circuit (IFFT circuit) 128. The IFFT circuit is a circuit conducting orthogonal transform processing for transforming and then modulating time axis data to frequency axis data by arithmetic operation by means of inverse Fourier transform. In this embodiment, an inverse Fourier transform circuit which conducts N-point (64-point in this case) transform processing is employed and the circuit outputs the transformed data as N-bit (64-bit) parallel data. The parallel data outputted from the inverse Fourier transform circuit 128 is supplied to a parallel/serial converter 129 and converted to serial data. The serial data is supplied to an output terminal 130 as OFDM-modulated data $y_n$. The OFDM-modulated data $y_n$ obtained at the output terminal 130 is supplied to a high frequency circuit (not shown) in which the data $y_n$ is subjected to transmission processing.

Now, description will be given to an example of the relationship between states in which data is inputted to the address decoder added registers 124a to 124n and operations of the counter 125 and the hold controller 126, with reference to FIG. 7. It is assumed that a convolutional coder 122 carries out coding at a coding rate of r=½ and that 2-bit data inputted to the respective registers 124a to 124n are in a state shown in FIG. 7A. At this time, the count state of the counter 125 under the control of the hold controller 126 is that shown in FIG. 7B. In this state, continuous count operation for two-clock time and hold processing of count values for one-clock time are periodically repeated. As a result, the address data outputted from the counter 125 is in state shown in FIG. 7C. The output of the same count value occurs once for three periods.

In this embodiment, one data set out of the two data sets inputted to the registers 124a to 124n is delayed by one clock. The symbols to be thinned out for puncture processing are simultaneously supplied to the registers 124a to 124n, whereby the operation of the counter 125 right after the thinning-out timing is controlled to be stopped. With such control being conducted, data are inputted to the inverse Fourier transform circuit 128 in a state shown in FIG. 7D. The data coded at a coding rate of r=¾ at which rate puncture processing for thinning out predetermined symbols is conducted, is supplied to the inverse Fourier transform circuit 128.

The reason for stopping the operation of the counter 125 right after the thinning-out timing is as follows. In case of thinning out input data $g_{11}$ and $g_{22}$ shown in FIG. 7A, for example, the address 5 of the counter at the time the data $g_{11}$ and $g_{22}$ are obtained is the same as the address 5 of the counter at the time data $g_{12}$ and $g_{23}$ are obtained at the next timing. The data $g_{12}$ and $g_{23}$ are overwritten on the registers on which the data $g_{11}$ and $g_{22}$ are written at the next timing and the data $g_{11}$ and $g_{22}$ are lost. As a result, the value of $x_5$ used in the inverse Fourier transform circuit 128 is ($g_{12}$, $g_{23}$) and the data ($g_{11}$, $g_{22}$) are thinned out.

The remaining constitution is the same as described in the preceding first embodiment. The basic transform processing of the Fourier transform circuit 128 is the same as that of the Fourier transform circuit 105 described in the first embodiment.

With the constitution of the third embodiment, the data inputted to the Fourier transform circuit 128 is interleaved and, at the same time, convolutionally coded to be subjected to puncture processing. The puncture processing can be easily carried out in this embodiment. That is, all is needed is to periodically control the counter operation using the hold controller 126. There is no need to conduct clock rate converting processing as described with reference to FIGS. 31 to 33 as the conventional system and puncture processing can be executed by conducting simple timing control. Further, since the puncture processing is conducted simultaneously with the interleave processing, the circuit for conducting both puncture processing and interleave processing can be made smaller in size than the conventional one and the power consumption of the processing circuit can be reduced. Furthermore, as for the clock rate used for processing, the clock rate for input data suffices. Due to this, there is no need to prepare a different clock rate, thereby making the constitution of a clock generating circuit simpler and preventing spurious interference or the like resulting from different clock rates from occurring.

In the third embodiment, the counter is used to generate address data corresponding to an interleave pattern. However, as described in the second embodiment, a shift register may be used to generate address data. In the latter case, if address data set to the shift registers are constituted to provide the same address once for three periods as shown in, for example, FIG. 7C, then a hold controller is not needed, making it possible to provide a simpler constitution.

Figure 8:
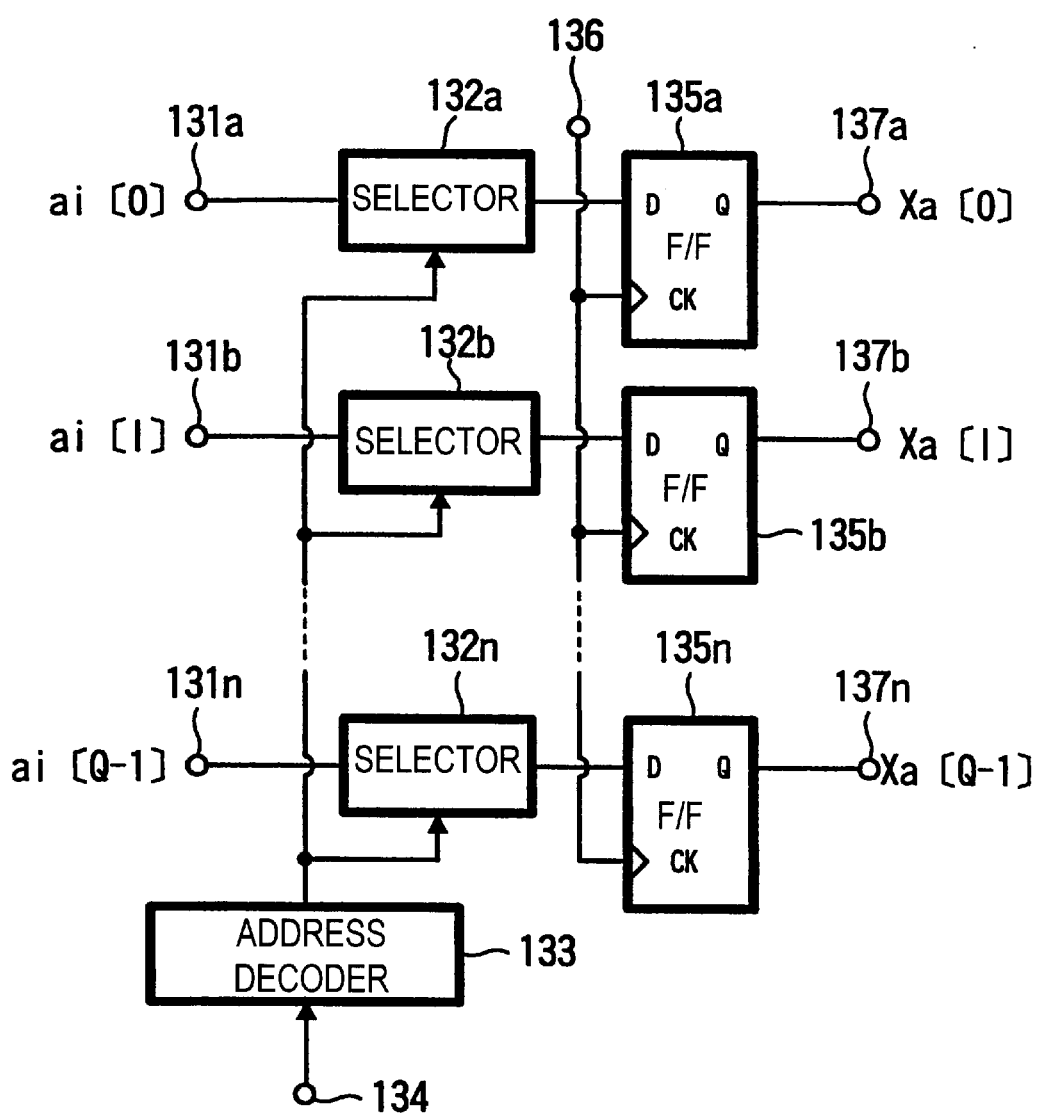
FIG. 8 is a block diagram showing an example of a constitution in the fourth embodiment according to the present invention.

Next, the fourth embodiment according to the present invention will be described with reference to FIG. 8. In the fourth embodiment as in the case of the preceding first embodiment, the present invention is applied to a modulator part in a transmitter radio-transmitting an OFDM modulation signal. An OFDM modulation signal to be transmitted is interleaved. FIG. 8 shows the constitution of a register portion in the modulator part in this embodiment. Data of Q-bit words are supplied to input terminals 131a, 131b, . . . 131n (where n is an arbitrary number) on a one-bit-by-one-bit basis. In this embodiment, data of 8-bit words are supplied.

The data of 8-bit words are supplied to selectors 132a, 132b, . . . 132n, respectively and batch selection processing is conducted based on the addresses detected by an address decoder 133. The address decoder 133 decodes address values supplied from a counter or shift register which is not shown to a terminal 134.

The data selected by the selectors 132a to 132n, respectively are supplied to D flip-flops 135a, 135b, . . . 135n and set synchronously with clocks supplied from a terminal 136. The data set to the D flip-flops 135a, 135b, . . . 135n are supplied from terminals 137a, 137b, . . . 137n, respectively, to an inverse Fourier transform circuit (not shown) as data of 8-bit words. The remaining parts are constituted in the same manner as described in the first embodiment. The transform processing of the Fourier transform circuit is the same as that of the Fourier transform circuit described in the first embodiment. In this embodiment, however, data in units of words consisting of a plurality of bits are subjected to transform processing.

With the constitution of the fourth embodiment, the data in units of words consisting of a plurality of bits can be inputted altogether and data in units of words can be efficiently interleaved.

Figure 9:
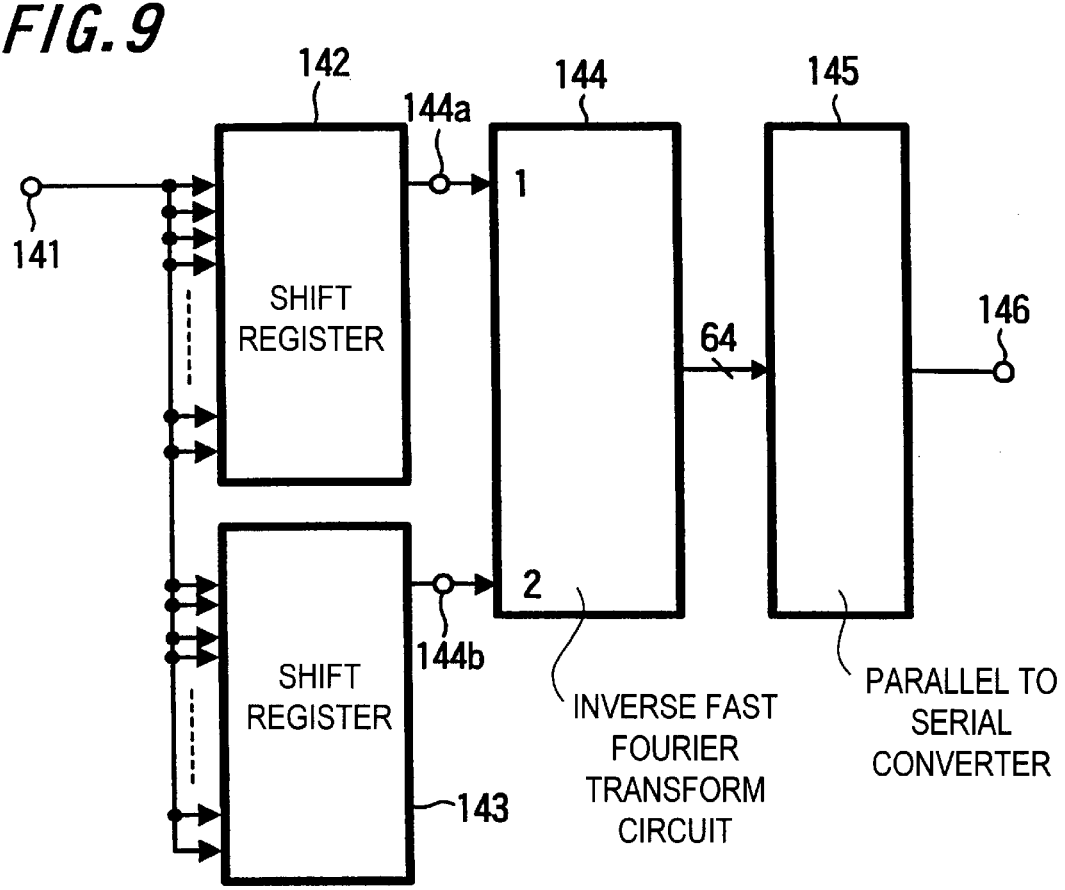
FIG. 9 is a block diagram showing an example of a constitution in the fifth embodiment according to the present invention.

The fifth embodiment according to the present invention will be described with reference to FIGS. 9 and 10. In this embodiment as in the preceding first embodiment, the present invention is applied to a modulator part in a transmitter radio-transmitting an OFDM modulation signal. An OFDM modulation signal to be transmitted is interleaved. FIG. 9 shows the constitution of the modulator part in this embodiment. Transmission data $a_i$ such as a base band signal is supplied to an input terminal 141. The transmission data $a_i$ obtained at the input terminal 141 is interleaved and OFDM modulated.

In this embodiment, the transmission data $a_i$ obtained at the input terminal 141 is supplied to two shift registers 142 and 143 and stored therein. The data set to the shift registers 142 and 143 are read in a predetermined order corresponding to an interleave pattern and simultaneously supplied to an inverse Fourier transform circuit 144. That is to say, the inverse Fourier transform circuit 144 in this embodiment is provided with two input terminals 144a and 144b. The inverse Fourier transform circuit 144 is a circuit conducting orthogonal transform processing for transforming and then modulating time axis data to frequency axis data by arithmetic operation by means of inverse Fourier transform. An inverse Fourier transform circuit which conducts N-point (64-point in this case) transform processing is employed herein and the circuit outputs the transformed data as N-bit (64-bit) parallel data.

In this case, 32 points of data from 0 to 31 are inputted from the input terminal 144a and 32 points of data from 32 to 63 are inputted from the input terminal 144b, for example. Thus, the shift registers 142 and 143 are designed such that 32 points of data can be set thereto, respectively.

The parallel data outputted from the inverse Fourier transform circuit 144 is supplied to a parallel/serial converter 145 and converted to serial data. The serial data is supplied to an output terminal 146 as OFDM-modulated data $y_n$. The OFDM-modulated data $y_n$ is supplied to a high frequency circuit (not shown) in which the data $y_n$ is subjected to transmission processing.

Figure 10:
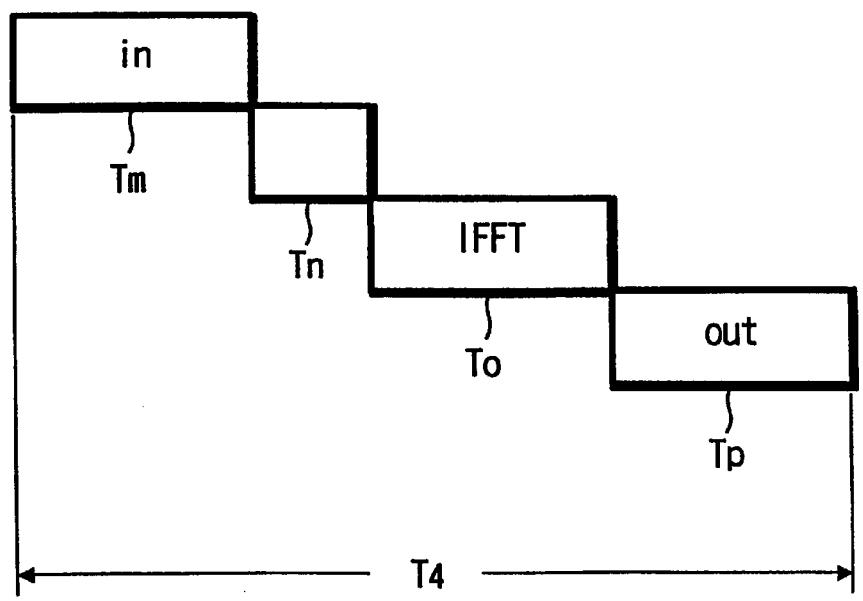
FIG. 10 is a timing view showing a processing state in the fifth embodiment according to the present invention.

FIG. 10 is a timing view showing a modulation processing state in the circuit in this embodiment, which processing state will be described hereinafter. There is, first, an input time Tm at which 64 points of data obtained at the input terminal 141 are inputted to the two shift registers 142 and 143. Then, there is an interleave processing time Tn at which the data set to the two shift registers 142 and 143 at the input time Tm are simultaneously inputted to the inverse Fourier transform circuit 144 in the order set by the shift registers 142 and 143. The interleave processing time Tn may be half the input time Tm. In case of 64 points of data, for example, the interleave processing time Tn may be a 32-clock time. Next, there comes an inverse Fourier transform processing time To at which inverse fast Fourier transform processing is conducted at the inverse Fourier transform circuit 144, and an output time Tp at which the inverse Fourier transformed data is outputted and subjected to parallel/serial conversion.

Figure 24:
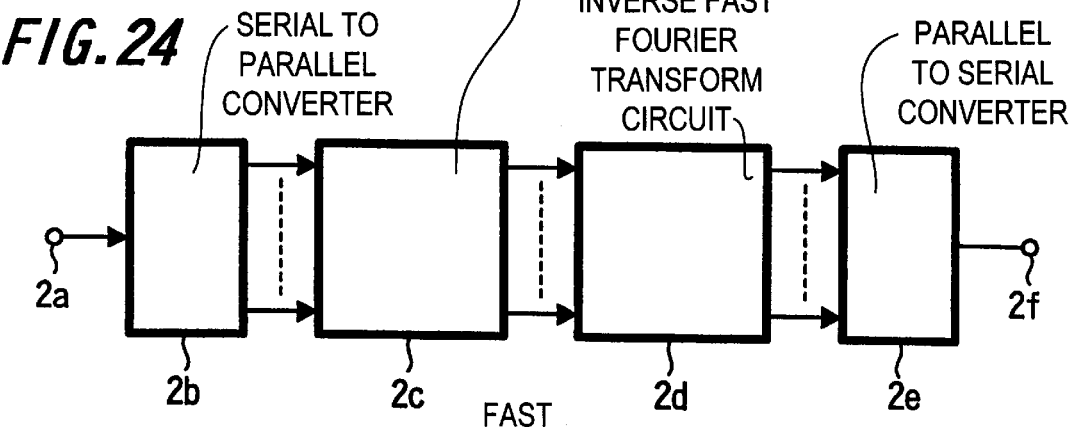
FIG. 24 is a block diagram showing an example of a constitution for modulating an interleaved OFDM wave.
Figure 25:
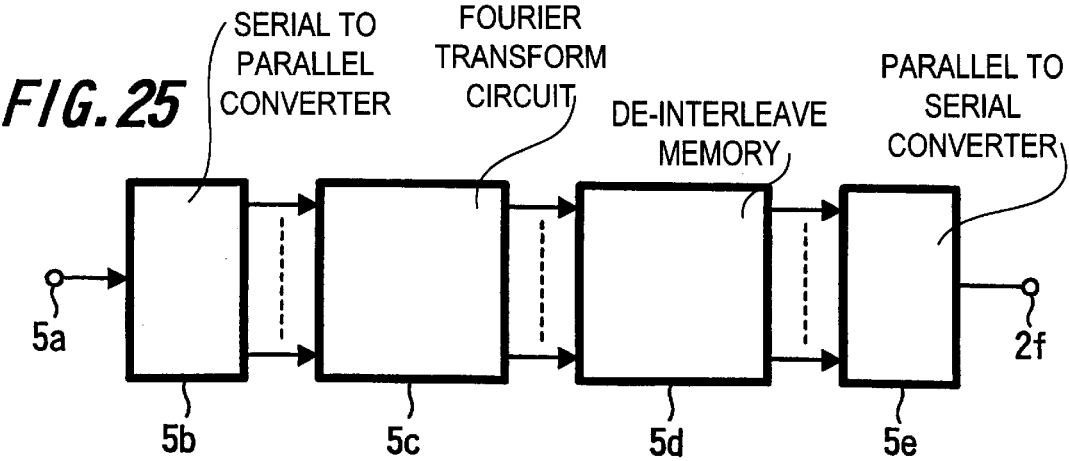
FIG. 25 is a block diagram showing an example of a conventional constitution for demodulating an interleaved OFDM wave.
Figure 26:
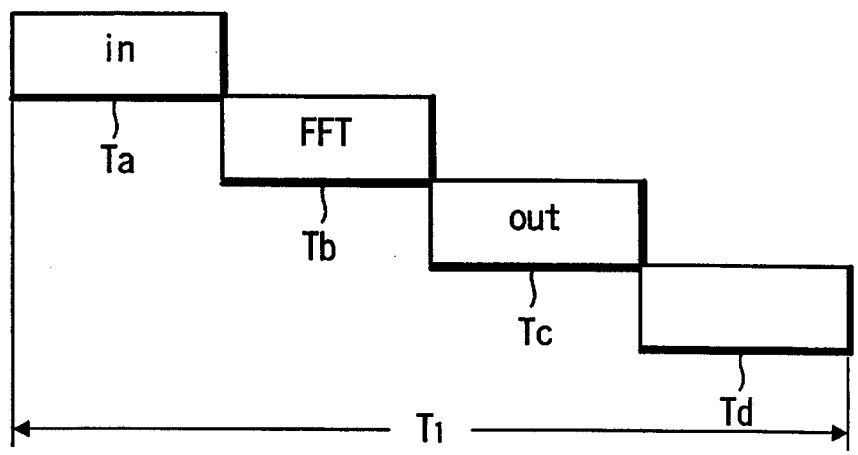
FIG. 26 is a timing view showing a demodulation processing state in the example of FIG. 25.
Figure 27A:
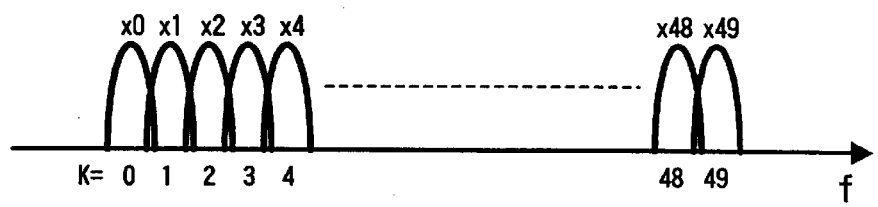
FIG. 27 is an explanatory view showing an example of a state in which a burst error occurs to an OFDM wave.
Figure 27B:
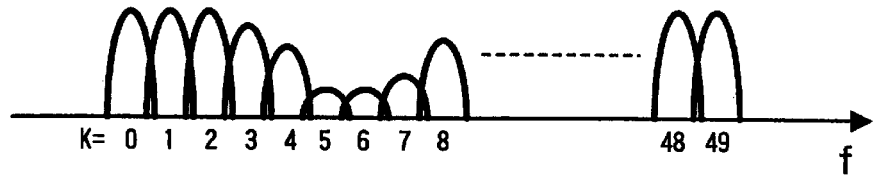
Figure 28A:
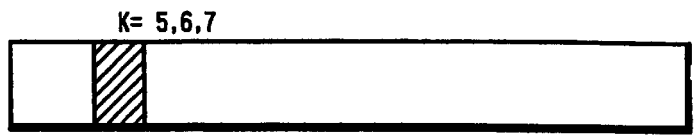
FIG. 28 is an explanatory view for comparing the error occurrence states with and without interleave processing.
Figure 28B:
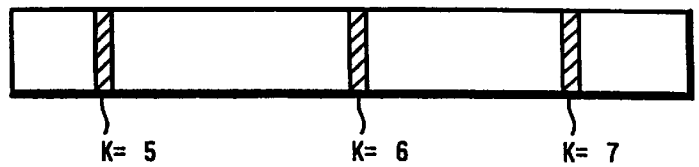

With the constitution of this embodiment in which the above-stated processing is conducted, it is possible to halve time required for interleave processing compared to conventional time, by which degree time required for processing for generating an interleaved OFDM modulation signal can be reduced. That is to say, a time $T_4$ shown in FIG. 10 includes a shorter time required for interleave processing and processing time is shorter than that at the modulation processing circuit shown as a conventional case in FIG. 24. To be specific, if 64 points of data are modulated at the inverse Fourier transform circuit, time or processing time corresponding to 32-clock time for input data can be shortened. Next, the sixth embodiment according to the present invention will be described with reference to FIG. 11. In the sixth embodiment as in the case of the first embodiment, the present invention is applied to a modulator part in a transmitter radio-transmitting an OFDM modulation signal. An OFDM modulation signal to be transmitted is interleaved. FIG. 11 shows the constitution of the modulator part in this embodiment. Transmission data $a_i$ such as a base band signal is supplied to an input terminal 151. The transmission data ai obtained at the input terminal 151 is interleaved and OFDM modulated.

Here in this embodiment, the transmission data ai obtained at the input terminal 151 is supplied to two shift registers 152 and 153 and stored therein. The data set to the respective shift registers 152 and 153 are read in a predetermined order corresponding to an interleave pattern. The data outputted from the shift registers 152 and 153 are supplied to differential coding circuit 154 and 155, respectively and differentially coded. The data differentially coded at the respective circuits are simultaneously supplied to two input terminals 156a and 156b of an inverse Fourier transform circuit 156. The inverse Fourier transform circuit 156 is a circuit conducting orthogonal transform processing for transforming and then modulating time axis data to frequency axis data by arithmetic operation by means of inverse Fourier transform. In this embodiment, an inverse Fourier transform circuit conducting N-point (64-point in this case) transform processing is employed and the circuit outputs the transformed data as N-bit (64-bit) parallel data.

In this case, 32 points of data from 0 to 31 are inputted from the input terminal 156a and 32 points of data from 32 to 63 are inputted from the input terminal 156b, for example. Therefore, the shift registers 152 and 153 are designed such that 32 points of data can be set thereto, respectively.

The parallel data outputted from the inverse Fourier transform circuit 156 is supplied to a parallel/serial converter 157 and converted to serial data. The serial data is supplied to an output terminal 158 as OFDM-modulated data $y_n$. The OFDM-modulated data $y_n$ obtained at the output terminal 158 is supplied to a high frequency circuit (not shown) in which the data $y_n$ is subjected to transmission processing.

With the constitution of this embodiment in which the above-described processing is conducted, as in the case of the fifth embodiment, it is possible to halve time required for interleave processing compared to the conventionally required time, by which degree time required for processing for generating an interleaved OFDM modulation signal can be shortened. In case of this embodiment, a differential coding processing is conducted at the input parts of the inverse Fourier transform circuit. This makes it possible to OFDM-modulate the differentially coded data and to conduct efficient OFDM modulation based on the differentially coded data.

Next, the seventh embodiment according to the present invention will be described with reference to FIG. 12. In the seventh embodiment as in the case of the preceding first embodiment, the present invention is applied to a modulator part in a transmitter radio-transmitting an OFDM modulation signal. An OFDM modulation signal to be transmitted is interleaved. FIG. 12 shows the constitution of the modulator part in this embodiment. Transmission data ai such as a base band signal is supplied to an input terminal 161. The transmission data ai obtained at the input terminal 161 is interleaved and OFDM modulated.

In this embodiment, the transmission data ai obtained at the input terminal 161 is supplied to two shift registers 162 and 163 and stored therein. The data set to the shift registers 162 and 163 are read in a predetermined order corresponding to an interleave pattern. Here in this embodiment, the read-out order of the shift register 162 is set opposite to that of the shift register 163. For example, the shift register 162 is read the set data from the beginning, whereas the shift register 163 reads the set data from the end.

Then, the data outputted from the shift registers 162 and 163 are supplied to and differentially coded by differential coding circuits 164 and 165. The data differentially coded at the respective circuits are simultaneously supplied to two input terminals 166a and 166b of the inverse Fourier transform circuit 166. The inverse Fourier transform circuit 166 is a circuit conducting orthogonal transform processing for transforming and then modulating time axis data to frequency axis data by arithmetic operation by means of inverse Fourier transform. In this embodiment, an inverse Fourier transform circuit conducting N-point (64-point in this case) transform processing is employed and the circuit outputs the transformed data as N-bit (64-bit) parallel data.

In this case, 32 points of data from 0 to 31 are inputted from the input terminal 166a and 32 points of data from 32 to 63 are inputted from the input terminal 166b, for example. Thus, the shift registers 162 and 163 are designed such that 32 points of data can be set thereto, respectively.

Then, the parallel data outputted from the inverse Fourier transform circuit 166 is supplied to a parallel/serial converter 167 and converted to serial data. The serial data is supplied to an output terminal 168 as OFDM-modulated data $y_n$. The OFDM-modulated data $y_n$ obtained at the output terminal 168 is supplied to a high frequency circuit (not shown) and subjected to transmission processing.

With the constitution of this embodiment in which the above-described processing is carried out, as in the case of the fifth and sixth embodiments, it is possible to halve time required for interleave processing compared with the conventionally required time, by which degree time required for processing for generating an interleaved OFDM modulation signal can be shortened. In this embodiment, as in the case of the sixth embodiment, differential coding processing is carried out at the input parts of the inverse Fourier transform circuit. This makes it possible to OFDM-modulate the differentially coded data and to conduct efficient OFDM modulation based on the differentially coded data. Moreover, in this embodiment, the data read-out orders of the two shift registers 162 and 163 are set opposite to each other. This allows providing a more complicated interleave pattern. To be specific, if the OFDM-modulated signal generated with the constitution of the sixth embodiment is a signal shown in, for example, FIG. 3B, the OFDM-modulated signal generated with the constitution of this (seventh) embodiment has the data array of points 39 to 63 (−25 to −1) of the signal shown in FIG. 3B opposite to that in the sixth embodiment.

Figure 13:
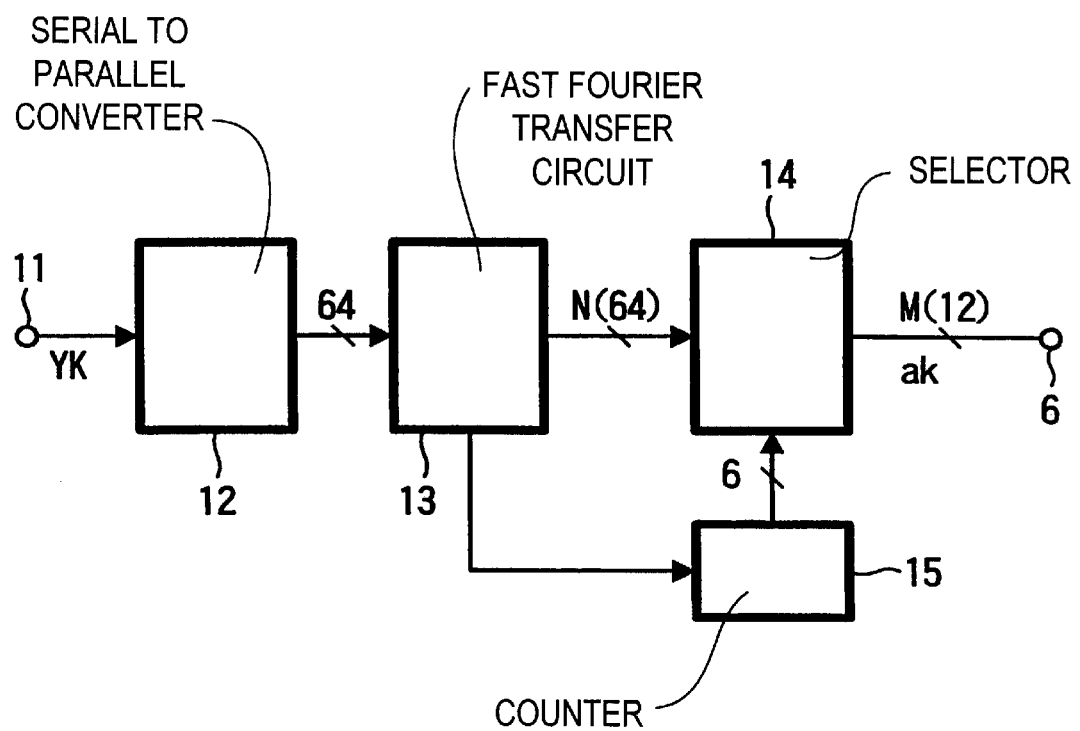
FIG. 13 is a block diagram showing an example of a constitution in the eighth embodiment according to the present invention.

The eighth embodiment according to the present invention will be described with reference to FIGS. 13 and 14.

In this embodiment, the present invention is applied to a demodulator part in a receiver receiving a radio-transmitted OFDM modulation signal. An OFDM modulation signal to be received is interleaved. FIG. 13 shows the constitution of the demodulator part in this embodiment. An OFDM modulation signal which is an intermediate frequency signal (or a base band signal) received is supplied to an input terminal 11. The OFDM modulation signal obtained at the input terminal 11 is supplied to a serial/parallel converter 12 and converted to parallel data of predetermined bits (64 bits in this case).

The parallel data of 64 bits outputted from the serial/parallel converter 12 is supplied to a Fourier transform circuit 13, in which orthogonal transform processing for transforming and then demodulating frequency axis data to time axis data by arithmetic operation by means of fast Fourier transform. Then N points of data of M bits are generated and one point of M-bit data is set to each of N output registers (not shown) provided at an output part of the Fourier transform circuit 13. To give an example of N points of M-bit data, if inputted parallel data consists of 64 bits, one point is generated out of 12 bits and 64 points of the 12-bit data are generated. That is, if the 64-bit data supplied to the Fourier transform circuit 13 is $\{X_k\}$, k=0 to 63 and the data $\{X_k\}$ is transformed to 64 points of 12-bit data $\{Y_n\}$ (n=0 to 63). In the following description, it is assumed that 64 points of 12-bit data are generated.

The 64 points of 12-bit data $\{Y_n\}$ outputted from the Fourier transform circuit 13 are simultaneously supplied to a selector 14. The selector 14 sequentially selects outputted points based on point designating data outputted by the counter 15 serving as output order data generating means. The selected points of 12-bit data $a_k$ are supplied to an output terminal 16.

The counter 15 is a circuit generating data for designating 64 points from 0 to 63 in a predetermined order by count processing. The counter 15 is constituted to generate data for sequentially designating points in an order corresponding to an interleave pattern applied to the received OFDM modulation signal.

In this case, a counter for generating 6-bit data from 0 to 63 is employed and the counter conducts count processing to provide 0, 5, 10, 15, . . . 58 and 63 in the order shown in, for example, Table 1 below. Every time one unit of data is transformed at the Fourier transform circuit 13, an output pulse is outputted to the counter 15. Upon supplied with the output pulse, the counter 15 starts count processing. In the example described herein, values from 25 to 38 are not counted.

TABLE 2

| 0→ | 5→ | 10→ | 15→ | 20→ | 39→ | 44→ | 49→ | 54→ | 59 |
|---|---|---|---|---|---|---|---|---|---|
| 1→ | 6→ | 11→ | 16→ | 21→ | 40→ | 45→ | 50→ | 55→ | 60 |
| 2→ | 7→ | 12→ | 17→ | 22→ | 41→ | 46→ | 51→ | 56→ | 61 |
| 3→ | 8→ | 13→ | 18→ | 23→ | 42→ | 47→ | 52→ | 57→ | 62 |
| 4→ | 9→ | 14→ | 19→ | 24→ | 43→ | 48→ | 53→ | 58→ | 63 |

If the count processing is conducted, 50 points are sequentially selected from among 64 points of 12-bit data $\{Y_n\}$ supplied to the selector 14 by the count outputs of the counter 15, and 12-bit data $a_k$ (k=0 to 49) shown in Table 2 below are sequentially outputted.

TABLE 3

Figure 14:
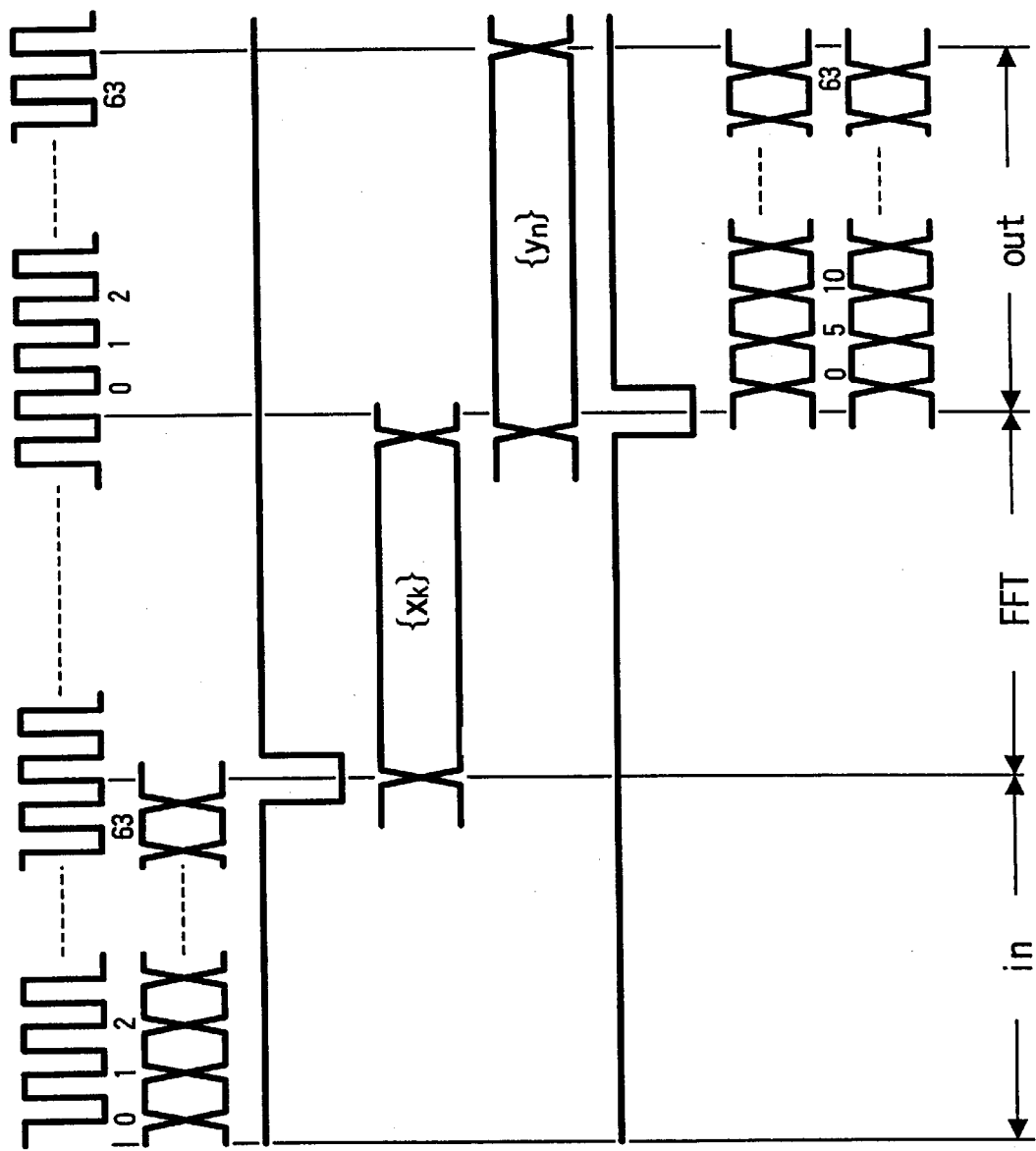
FIG. 14 is a timing view showing a processing state in the eighth embodiment according to the present invention.

$a_0 \leftarrow y_0$
$a_1 \leftarrow y_5$
$a_2 \leftarrow y_{10}$
$a_3 \leftarrow y_{15}$
$a_4 \leftarrow y_{20}$
$a_5 \leftarrow y_{39}$
$a_6 \leftarrow y_{44}$
$a_7 \leftarrow y_{49}$
$a_8 \leftarrow y_{54}$
$a_9 \leftarrow y_{59}$
$a_{10} \leftarrow y_1$
$a_{11} \leftarrow y_6$
$a_{12} \leftarrow y_{11}$
$a_{13} \leftarrow y_{16}$ TABLE 3-continued $a_{14} \leftarrow y_{21}$
$a_{15} \leftarrow y_{40}$
$a_{16} \leftarrow y_{45}$
$a_{17} \leftarrow y_{50}$
$a_{18} \leftarrow y_{55}$
$a_{19} \leftarrow y_{60}$
$a_{20} \leftarrow y_{2}$
$a_{21} \leftarrow y_{7}$
$a_{22} \leftarrow y_{12}$
$a_{23} \leftarrow y_{17}$
$a_{24} \leftarrow y_{22}$
$a_{25} \leftarrow y_{41}$
$a_{26} \leftarrow y_{46}$
$a_{27} \leftarrow y_{51}$
$a_{28} \leftarrow y_{56}$
$a_{29} \leftarrow y_{61}$
$a_{30} \leftarrow y_{3}$
$a_{31} \leftarrow y_{8}$
$a_{32} \leftarrow y_{13}$
$a_{33} \leftarrow y_{18}$
$a_{34} \leftarrow y_{23}$
$a_{35} \leftarrow y_{42}$
$a_{36} \leftarrow y_{47}$
$a_{37} \leftarrow y_{52}$
$a_{38} \leftarrow y_{57}$
$a_{39} \leftarrow y_{62}$
$a_{40} \leftarrow y_{4}$
$a_{41} \leftarrow y_{9}$
$a_{42} \leftarrow y_{14}$
$a_{43} \leftarrow y_{19}$
$a_{44} \leftarrow y_{24}$
$a_{45} \leftarrow y_{43}$
$a_{46} \leftarrow y_{48}$
$a_{47} \leftarrow y_{53}$
$a_{48} \leftarrow y_{58}$
$a_{49} \leftarrow y_{63}$ FIG. 14 is a timing view showing a demodulation processing state in the circuit in this embodiment. The processing state will be described hereinafter. A clock signal (FIG. 14A) synchronous with the received data obtained at the input terminal 11 is supplied to the serial/parallel converter 12, the Fourier transform circuit 13 and the counter 15. The respective circuits carry out their processings synchronously with the clock signal. At the first input time, input data (FIG. 14B) synchronous with the clock signal is supplied, one unit of the input data is subjected to input processing and then a start pulse (FIG. 14C) is supplied from an external controller (not shown) to the Fourier transform circuit 13. At the Fourier transform circuit 13, fast Fourier transform processing (FFT processing) starts and the transform processing for the input data $\{X_k\}$ is carried out for a predetermined time.

When the Fourier transform processing starts, the 64 points of data $\{Y_n\}$ which have been transformed are subjected to output processing as shown in FIG. 14E and supplied to a selector 14. Here, if data output from the Fourier transform circuit 13 starts, an output pulse (FIG. 14F) synchronous with the output is supplied from the Fourier transform circuit 13 to the counter 15. This output pulse may be supplied from another circuit to the counter 15.

If the output pulse is supplied to the counter 15, count processing is conducted synchronously with the clock signal in a preset order as in the case of the Table 1 mentioned above. Count outputs (FIG. 14G) are supplied to the selector 14. Then, data consisting of 64 points of data $\{Y_n\}$ are outputted one-point-by-one-point in a designated order. It is noted that since the counter 15 is designed not to count values from 25 to 37 in this embodiment, 14 points of data from 25 to 38 among 64 points of data from 0 to 63 are not selected and not obtained at the output terminal 16.

In case of conducting the above-stated transform processing, the OFDM modulation signal having a frequency spectrum shown in FIG. 3A already stated above is orthogonally transformed and demodulated. That is, the data $\{X_k\}$ inputted to the Fourier transform circuit 13 includes data of n=0 to 24 and n=39 to 63 arranged on the frequency axis at certain intervals. The data arranged on the frequency axis, which become the orthogonally transformed data $\{Y_n\}$, are outputted from the Fourier transform circuit 13, the selector 14 selects points from among those of the data $\{Y_n\}$, which are obtained at the output terminal 16 as de-interleaved array of data $a_k$. The transform processing of the Fourier transform circuit 13 is shown by the following Expression [2]:

$$y_n = \sum_{k=0}^{63} x_k e^{j\frac{2\pi kn}{64}}. \qquad \text{Expression [2]}$$

In the frequency spectrum shown in FIG. 3A, data are divided into two groups. The frequency spectrum is equivalent to a continuous spectrum centered around k=0 shown in FIG. 3B. In case of expressing the data in the continuous spectrum as shown in FIG. 3B, the transform expression of the Fourier transform circuit 13 is as follows:

$$y_n = \sum_{k=-25}^{24} x_k e^{j\frac{2\pi kn}{64}}. \qquad \text{Expression [3]}$$

Figure 29:
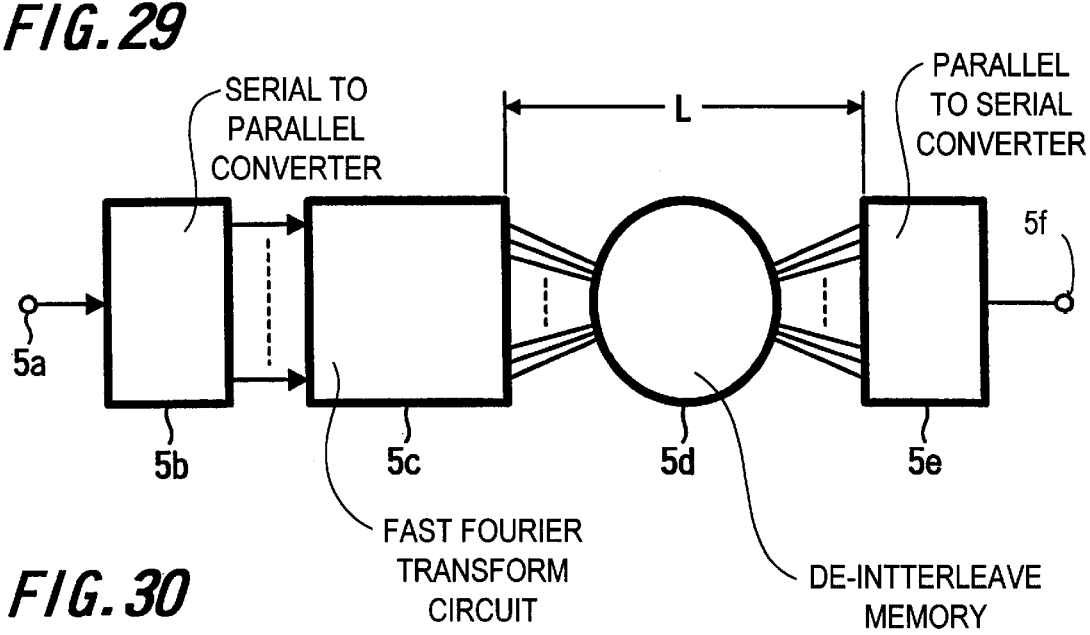
FIG. 29 is a block diagram showing another example of a conventional constitution for demodulating an interleaved OFDM wave.
Figure 30:
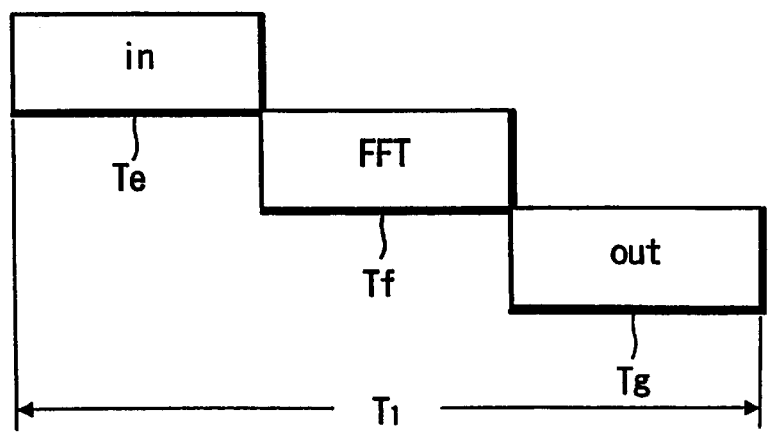
FIG. 30 is a timing view showing a demodulation processing state in the example of FIG. 29.

With the constitution of this embodiment in which the above-stated processing is carried out, if the interleaved OFDM modulation signal is received and orthogonally transformed, de-interleave processing for returning the array of the interleaved data to the original data array only by selecting the transform outputs of the Fourier transform circuit 13 using the selector 14. Therefore, it is possible to conduct de-interleave processing to the OFDM modulation signal with a simple constitution which does not require a memory used for de-interleave processing and wiring change processing for de-interleave and, thereby, to make the constitution for demodulating the interleaved OFDM modulation signal simpler than the conventional constitution. For example, compared with conducting wiring change processing for de-interleave (see FIG. 29), there is no need to provide a parallel/serial converter and the circuit size from the input terminal 11 to the output terminal 16 (corresponding to that from the terminal 5a to the terminal 5f in FIG. 29) can be greatly reduced. The area of the board on which circuits are incorporated corresponding to these portion can be reduced to about one-third of that in case of de-interleave wiring change processing. Compared with a case where de-interleave processing is carried out using a memory, the area of the board can be reduced similarly.

In addition, as for time required for demodulation processing, the selection processing of the selector 14 is simultaneously conducted with the output of data from the Fourier transform circuit 13. Owing to this, no excessive time for selection processing is added to the demodulation processing time. Compared with a case where de-interleave processing is carried out using a memory or the like, processing time is not lengthened since time for de-interleave processing is not needed.

Figure 15:
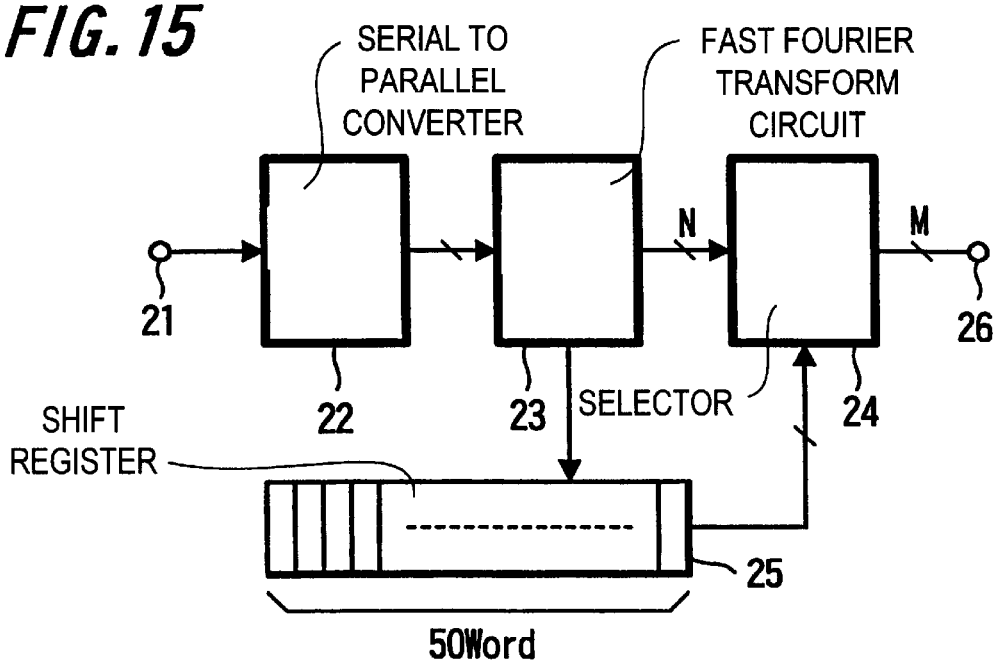
FIG. 15 is a block diagram showing an example of a constitution in the ninth embodiment according to the present invention.

Next, the ninth embodiment according to the present invention will be described with reference to FIG. 15. In the ninth embodiment as in the case of the preceding eighth embodiment, the present invention is applied to a demodulator part in a receiver receiving a radio-transmitted OFDM modulation signal. An OFDM modulation signal to be received is interleaved. FIG. 15 shows the constitution of the demodulator part in this embodiment. An OFDM modulation signal which is an intermediate frequency signal (or a base band signal) received is supplied to an input terminal 21. The OFDM modulation signal obtained at the input terminal 21 is supplied to a serial/parallel converter 22 and converted to parallel data of predetermined bits.

The parallel data outputted from the serial/parallel converter 22 is supplied to a Fourier transform circuit 23, in which orthogonal transform processing for transforming and then demodulating frequency axis data to time axis data by arithmetic operation by means of fast Fourier transform. Then N points of M-bit data are generated and one point of M-bit data is set to each of N output registers (not shown) provided at an output part of the Fourier transform circuit 23.

The N points of data outputted from the Fourier transform circuit 23 are simultaneously supplied to a selector 24. The selector 24 sequentially selects outputted points based on point designating data outputted by the shift register 25 serving as output order data generating means. The selected points of data are supplied to an output terminal 26.

The shift register 25 is one in which data for designating selected points are stored in the output order (in this case 50-word data are stored, for example). By being supplied with an output pulse from the Fourier transform circuit 23 or the like, the stored data of a plurality of words are outputted on a one-word-by-one-word basis per clock and supplied to the selector 24. In this case, the order in which the stored plural words are outputted corresponds to an interleave pattern applied to the received OFDM modulation signal. The order is set in advance so as to output data for sequentially designating points.

The remaining constitution is the same as that described in the preceding eighth embodiment. The transform processing of the Fourier transform circuit 23 is exactly the same as that of the Fourier transform circuit 13 described in the eighth embodiment.

In case of the constitution of the ninth embodiment, a shift register is employed as output order data generating means. This makes it possible to conduct de-interleave processing in the order in which data are stored in the shift register and to easily deal with the complicated interleave pattern by making the data set to the register data corresponding to the interleave pattern.

Figure 16:
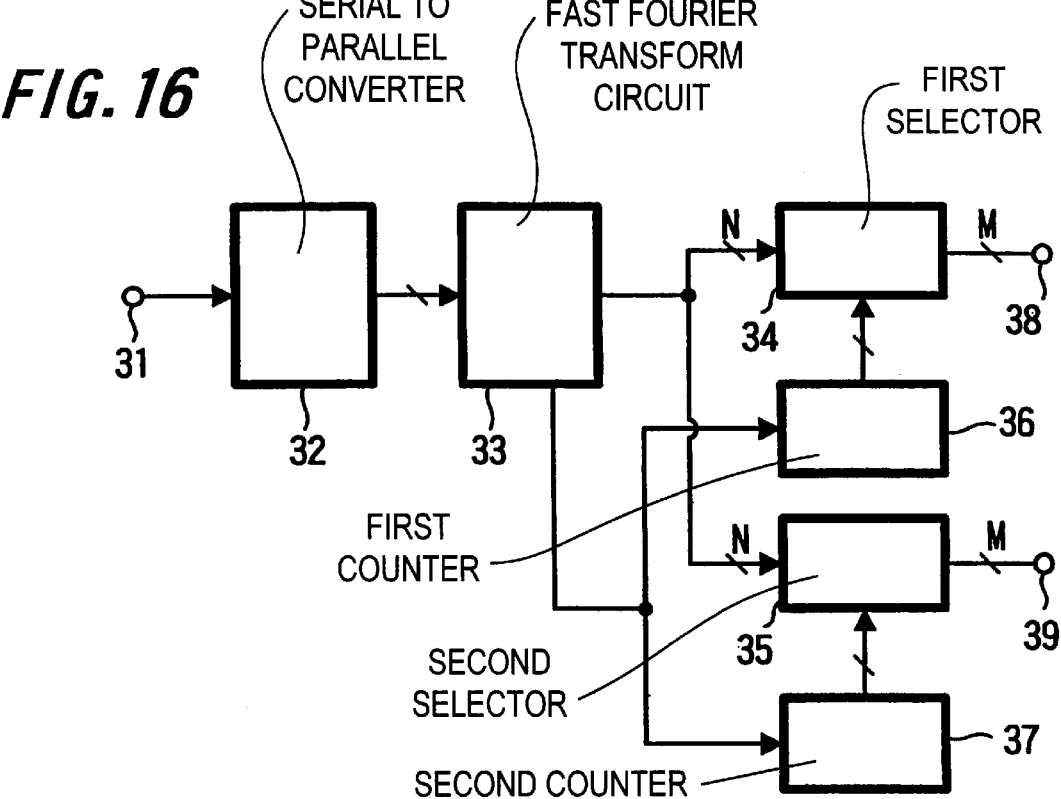
FIG. 16 is a block diagram showing an example of a constitution in the tenth embodiment according to the present invention.

Next, the tenth embodiment according to the present invention will be described with reference to FIG. 16. In the tenth embodiment as in the case of the preceding eighth and ninth embodiments, the present invention is applied to a demodulator part in a receiver receiving a radio-transmitted OFDM modulation signal. An OFDM modulation signal to be received is interleaved. FIG. 16 shows the constitution of the demodulator in this embodiment. An OFDM modulation signal which is an intermediate frequency signal (or a base band signal) received is supplied to an input terminal 31. The OFDM modulation signal obtained at the input terminal 31 is supplied to a serial/parallel converter 32 and converted to parallel data of predetermined bits.

The parallel data outputted from the serial/parallel converter 32 is supplied to a Fourier transform circuit 33, in which orthogonal transform processing for transforming and then demodulating frequency axis data to time axis data by arithmetic operation by means of fast Fourier transform. Thereafter, N points of M-bit data are generated and one point of M-bit data is set to each of N output registers (not shown) provided at an output part of the Fourier transform circuit 33.

The N points of data outputted from the Fourier transform circuit 33 are simultaneously supplied to the first selector 34 and the second selector 35. The first selector 34 sequentially selects outputted points based on point designating data outputted by the first counter 36 serving as output order data generating means. The selected points of data are supplied to an output terminal 38. The second selector 35 sequentially selects outputted points based on point designating data outputted by the second counter 37 serving as output order data generating means, and supplies the selected points of data to an output terminal 39.

The first and second counters 36 and 37 are circuits generating data for designating N points in a predetermined order by means of count processing. These counters generate data for sequentially designating the points in an order corresponding to the interleave pattern applied to the received OFDM modulation signal. Upon supplied with an output pulse from the Fourier transform circuit 33 or the like, the circuits conduct data generation processing. In this embodiment, however, timing at which the count data is outputted from the first counter 36 differs from that at which the count data is outputted from the second counter 37 (by, for example, a predetermined phase or phases).

The remaining constitution is the same as that described in the preceding eighth embodiment. The transform processing of the Fourier transform circuit 33 is exactly the same as that of the Fourier transform circuit 13 described in the eighth embodiment.

With the constitution of the tenth embodiment, two data sets of different timing are obtained as orthogonally transformed data. This embodiment is, therefore, suited for a case where two sets of reception data are needed for modulation and/or demodulation processing. In the constitution of FIG. 5 described in the third embodiment, the counters 36 and 37 are employed as output order data generating means. As described in the ninth embodiment, the counters may be replaced by shift registers.

The eleventh embodiment according to the present invention will be described with reference to FIG. 17. In the eleventh embodiment as in the case of the preceding embodiments, the present invention is applied to a demodulator part in a receiver receiving a radio-transmitted OFDM modulation signal. An OFDM modulation signal to be received is interleaved. FIG. 17 shows the constitution of the demodulator part in this embodiment. An OFDM modulation signal which is an intermediate frequency signal (or a base band signal) received is supplied to an input terminal 41. The OFDM modulation signal obtained at the input terminal 41 is supplied to a serial/parallel converter 42 and converted to parallel data of predetermined bits.

The parallel data outputted from the serial/parallel converter 42 is supplied to a Fourier transform circuit 43, in which orthogonal transform processing for transforming and then demodulating frequency axis data to time axis data by arithmetic operation by means of fast Fourier transform. Then N points of M-bit data are generated and one point of M-bit data is set to each of N output registers (not shown) provided at an output part of the Fourier transform circuit 43.

The N points of data outputted from the Fourier transform circuit 43 are simultaneously supplied to the first selector 44 and the second selector 45. The first selector 44 sequentially selects outputted points based on data for designating points outputted by the first counter 46 serving as output order data generating means. The selected points of data are supplied to one input part of a differential demodulator circuit 48. The second selector 45 sequentially selects outputted points based on data for designating points outputted by the second counter 47 serving as output order data generating means. The selected points of data are supplied to the other input part of the differential demodulator circuit 48.

The first and second counters 46 and 47 are circuits generating data for designating N points in a predetermined order by means of count processing. These counters generate data for sequentially designating the points in an order corresponding to the interleave pattern applied to the received OFDM modulation signal. Upon supplied with an output pulse from the Fourier transform circuit 43 or the like, the circuits conduct data generation processing. In this embodiment, however, timing at which the count data is outputted from the first counter 46 differs from that at which the count data is outputted from the second counter 47 (by, for example, a predetermined phase or phases).

The differential demodulator circuit 48 conducts differential demodulation processing using two sets of supplied data which are shifted by a predetermined phase or phases, obtains differentially demodulated data and supplies the demodulated data to a circuit in a later stage from an output terminal 49.

The remaining constitution is the same as that described in the preceding embodiments. The transform processing of the Fourier transform circuit 43 is exactly the same as that of the Fourier transform circuit 13 described in the eighth embodiment.

With the constitution of the eleventh embodiment, two data sets having shifted phases are obtained as orthogonally transformed data. Based on the two data sets, the differential demodulator circuit 48 conducts differential demodulation processing. Due to this, it is possible to obtain good demodulation data by the differential demodulation processing, to obtain two sets of received data necessary for differential demodulation by conducting de-interleave processing with a simple constitution, and to receive and demodulate an OFDM modulation signal which has been interleaved with a simple constitution. In the constitution of FIG. 17 described in the eleventh embodiment, the counters 46 and 47 are employed as output order data generating means. As described in the ninth embodiment, the counters may be replaced by shift registers.

The twelfth embodiment according to the present invention will be described with reference to FIG. 18. In the twelfth embodiment as in the case of the preceding embodiments, the present invention is applied to a demodulator part in a receiver receiving a radio-transmitted OFDM modulation signal. An OFDM modulation signal to be received is interleaved. FIG. 18 shows the constitution of the demodulator in this embodiment. An OFDM modulation signal which is an intermediate frequency signal (or a base band signal) received is supplied to an input terminal 51. The OFDM modulation signal obtained at the input terminal 51 is supplied to a serial/parallel converter 52 and converted to parallel data of predetermined bits.

The parallel data outputted from the serial/parallel converter 52 is supplied to a Fourier transform circuit 53, in which orthogonal transform processing for transforming and then demodulating frequency axis data to time axis data is carried out by arithmetic operation by means of fast Fourier transform. Then N points of M-bit data are then generated and one point of M-bit data is set to each of N output registers (not shown) provided at an output part of the Fourier transform circuit 53.

The N points of data outputted from the Fourier transform circuit 53 are simultaneously supplied to the first selector 54 and the second selector 55. The first selector 54 is directly supplied with point designating data outputted from a counter 56 serving as output order data generating means and thereby sequentially selects outputted points. The selected points of data are supplied to one input part of a differential demodulator circuit 58. The second selector 55 sequentially selects outputted points based on data which is delayed by a predetermined phase by a delay circuit 57 from the point designating data outputted from the counter 56. The selected points of data are supplied to the other input part of the differential demodulator circuit 58.

The counter 56 is a circuit generating data for designating N points in a predetermined order by count processing. The counter 56 is constituted to generate data for designating the respective points in an order corresponding to the interleave pattern applied to the received OFDM modulation signal. When an output pulse is supplied from the Fourier transform circuit 53 or the like, the counter 56 conducts data generation processing.

The differential demodulator circuit 58 conducts differential demodulation processing using two sets of supplied data shifted each other by a predetermined phase(s), obtains differentially demodulated data and supplies the demodulated data to a circuit in a later stage from an output terminal 59.

The remaining constitution is the same as that described in the preceding embodiments. The transform processing of the Fourier transform circuit 53 is exactly the same as that of the Fourier transform circuit 13 described in the eighth embodiment.

With the constitution of the twelfth embodiment, two data sets having shifted phases are obtained as orthogonally transformed data. Based on the two data sets, the differential demodulator circuit 58 conducts differential demodulation processing. Due to this, it is possible to obtain good demodulation data by the differential demodulation processing as in the case of the fourth embodiment. In the case of the constitution of this embodiment, the count output of a counter 56 is directly supplied to the first selector 54 and, at the same time, allows a delay circuit 57 to delay the count output by a predetermined phase(s) and supplies the delayed output to the second selector 55. Thus, by providing only one output order data generating means such as a counter, it is possible to conduct selection processing at the appropriate timing of the two selectors 54 and 55, by which degree the constitution can be made simple. In the constitution of FIG. 18 described in the twelfth embodiment, the counter 56 is employed as output order data generating means. As described in the ninth embodiment, the counter may be replaced by a shift register.

Figure 19:
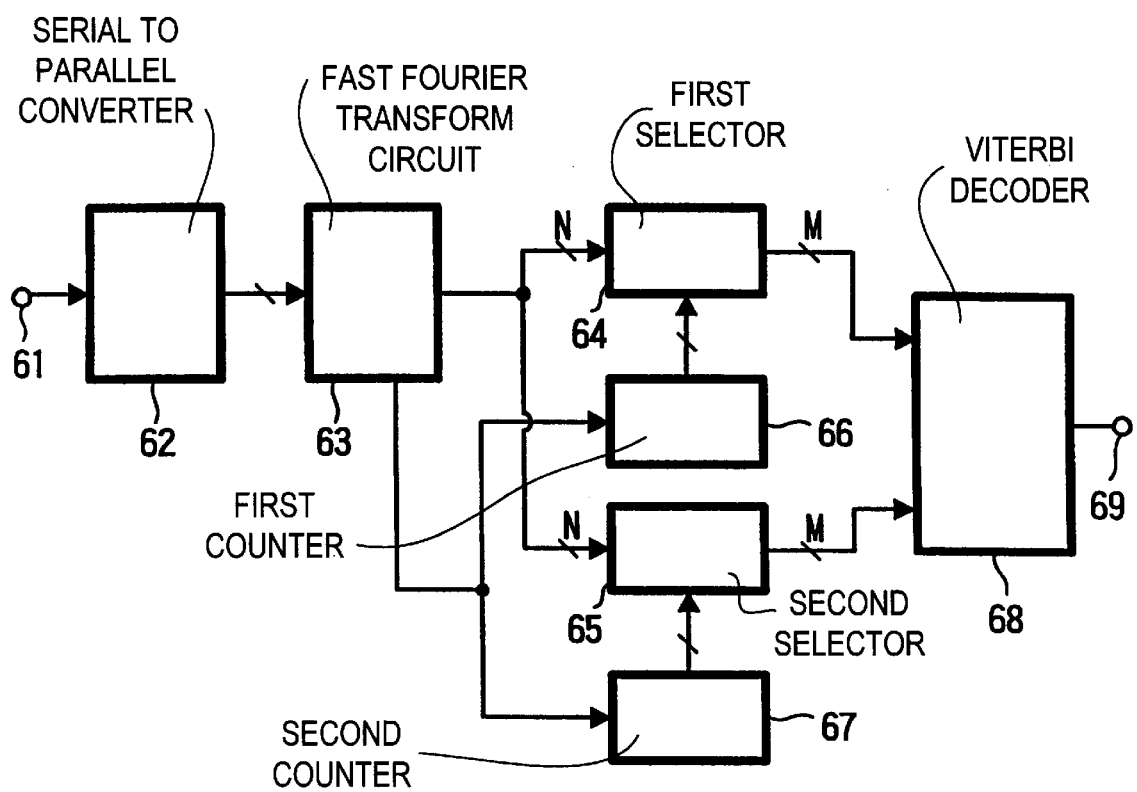
FIG. 19 is a block diagram showing an example of a constitution in the thirteenth embodiment according to the present invention.

The thirteenth embodiment according to the present invention will be described with reference to FIG. 19. In the thirteenth embodiment as in the case of the preceding embodiments, the present invention is applied to a demodulator part in a receiver receiving a radio-transmitted OFDM modulation signal. An OFDM modulation signal to be received is interleaved. FIG. 19 shows the constitution of the demodulator in this embodiment. An OFDM modulation signal which is an intermediate frequency signal (or a base band signal) received is supplied to an input terminal 61. The OFDM modulation signal obtained at the input terminal 61 is supplied to a serial/parallel converter 62 and converted to parallel data of predetermined bits.

The parallel data outputted from the serial/parallel converter 62 is supplied to a Fourier transform circuit 63, in which orthogonal transform processing for transforming and then demodulating frequency axis data to time axis data by arithmetic operation by means of fast Fourier transform. N points of M-bit data are then generated and one point of M-bit data is set to each of N output registers (not shown) provided at an output part of the Fourier transform circuit 63.

The N points of data outputted from the Fourier transform circuit 63 are simultaneously supplied to the first selector 64 and the second selector 65. The first selector 64 sequentially selects outputted points based on point designating data outputted by the first counter 66 serving as output order data generating means. The selected points of data are supplied to one input part of a Viterbi decoder 68. The second selector 65 sequentially selects outputted points based on point designating data outputted by the second counter 67 serving as output order data generating means. The selected points of data are supplied to the other input part of the Viterbi decoder 68.

The first and second counters 66 and 67 are circuits generating data for designating N points in a predetermined order by means of count processing. These counters generate data for sequentially designating the points in an order corresponding to the interleave pattern applied to the received OFDM modulation signal. Upon supplied with an output pulse from the Fourier transform circuit 63 or the like, the circuits conduct data generation processing. In this embodiment, however, timing at which count data is outputted from the first counter 66 differs from that at which count data is outputted from the second counter 67 (by, for example, a predetermined phase or phases).

The Viterbi decoder 68 conducts Viterbi decoding processing using two sets of supplied data shifted each other by a predetermined phase(s), obtains the Viterbi-decoded data and supplies the decoded data to a circuit in a later stage from an output terminal 69.

The remaining constitution is the same as that described in the preceding embodiments. The transform processing of the Fourier transform circuit 63 is exactly the same as that of the Fourier transform circuit 13 described in the eighth embodiment.

With the constitution of the thirteenth embodiment, two data sets having shifted phases are obtained as orthogonally transformed data. Based on the two data sets, the Viterbi decoder 68 conducts Viterbi decoding processing. Due to this, it is possible to obtain good decoded data by the Viterbi decoding processing, to obtain two sets of received data necessary for Viterbi decoding after being de-interleaved with a simple constitution, and to receive and decode an OFDM modulation signal which has been interleaved with a simple constitution. In the constitution of FIG. 19 described in the sixth embodiment, the counters 66 and 67 are employed as output order data generating means. As described in the ninth embodiment, the counters may be replaced by shift registers.

Figure 20:
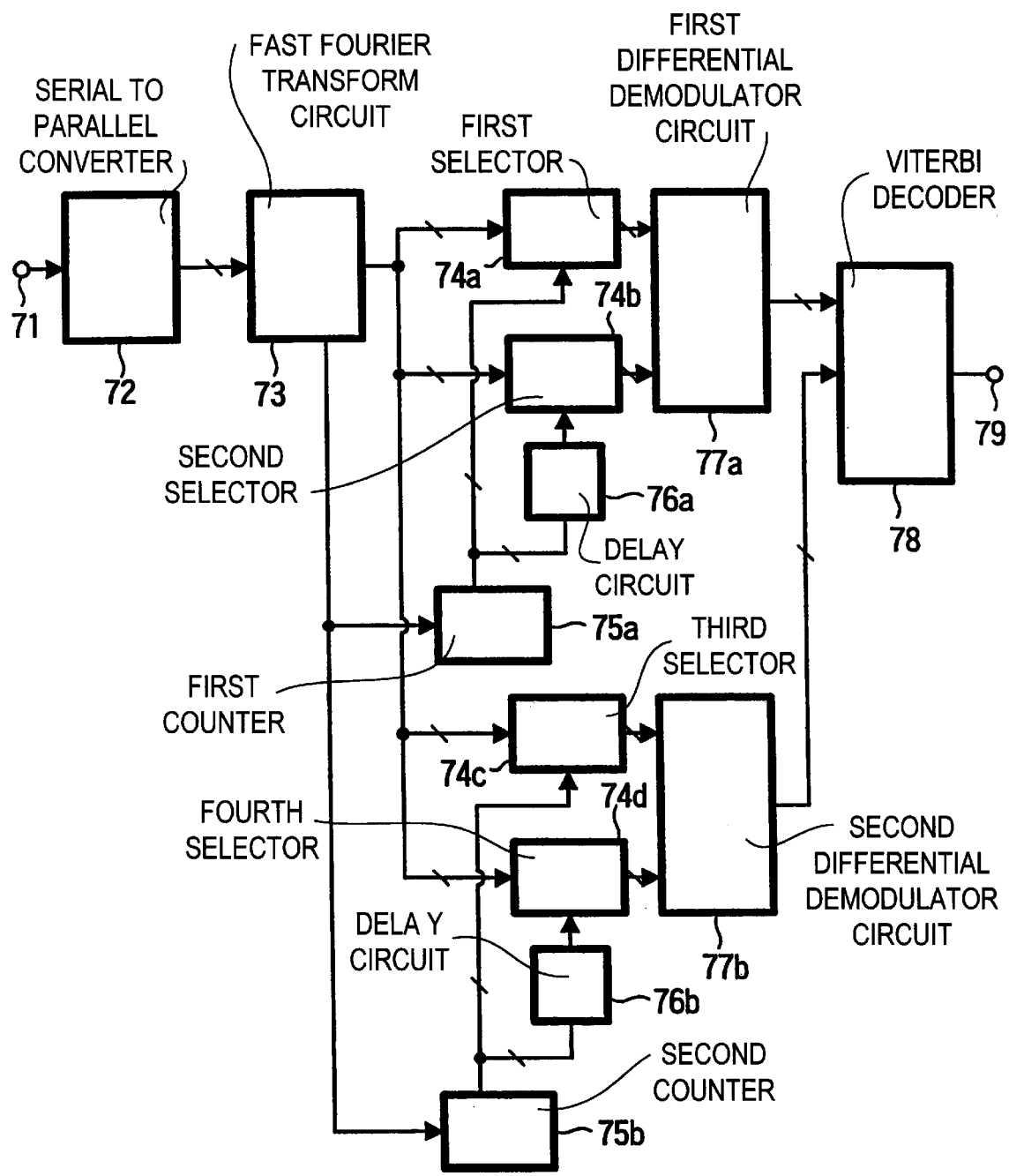
FIG. 20 is a block diagram showing an example of a constitution in the fourteenth embodiment according to the present invention.

The fourteenth embodiment according to the present invention will be described with reference to FIG. 20. In the fourteenth embodiment as in the case of the preceding embodiments, the present invention is applied to a demodulator part in a receiver receiving a radio-transmitted OFDM modulation signal. An OFDM modulation signal to be received is interleaved. FIG. 20 shows the constitution of the demodulator part in this embodiment. An OFDM modulation signal which is an intermediate frequency signal (or a base band signal) received is supplied to an input terminal 71. The OFDM modulation signal obtained at the input terminal 71 is supplied to a serial/parallel converter 72 and converted to parallel data of predetermined bits.

The parallel data outputted from the serial/parallel converter 72 is supplied to a Fourier transform circuit 73, in which orthogonal transform processing for transforming and then demodulating frequency axis data to time axis data by arithmetic operation by means of fast Fourier transform is carried out. N points of M-bit data are then generated and one point of M-bit data is set to each of N output registers (not shown) provided at the output part of the Fourier transform circuit 73.

The N points of data outputted from the Fourier transform circuit 73 are simultaneously supplied to the first, second, third and fourth selectors 74a, 74b, 74c and 74d. The first selector 74a is directly supplied with point designating data outputted by the first counter 75a serving as output order data generating means and thereby sequentially selects outputted points. The selected points of data are supplied to one input part of the first differential demodulator circuit 77a. The second selector 74b sequentially selects outputted points based on data delayed by a predetermined phase(s) by a delay circuit 76a from the point designating data outputted from the first counter 75a, and supplies the selected points of data to the other input part of the first differential demodulator circuit 77a.

The third selector 74c is directly supplied with point designating data outputted by the second counter 75b serving as output order data generating means and, thereby, sequentially selects outputted points. The selected points of data are supplied to one input part of the second differential demodulator circuit 77b. The fourth selector 74d sequentially selects outputted points based on the data delayed by a predetermined phase(s) by a delay circuit 76b from the point designating data outputted by the second counter 75b. The selected points of data are supplied to the other input part of the second differential demodulator circuit 77b.

The first and second counters 75a and 75b are circuits generating data for sequentially designating the N points in a predetermined order by means of count processing. The counters are constituted to generate data for sequentially designating the points in an order corresponding to the interleave pattern applied to the received OFDM modulation signal. When an output pulse is supplied to the counters from the Fourier transform circuit 73 or the like, the counters conduct data generation processing. In this case, the timing of the count of the first counter 75a is shifted from that of the count of the second counter and 75b by a predetermined amount.

The first and second differential demodulator circuit 77a and 77b conduct differential demodulation using two sets of supplied data shifted each other by a predetermined phase (s), obtain differentially demodulated data, and supply the demodulated data of respective demodulators 77a and 77b to one and the other input parts of a Viterbi decoder 78, respectively. The Viterbi decoder 78 conducts Viterbi decoding processing using the two sets of supplied, demodulated data, obtains Viterbi-decoded data and supplies the decoded data to a circuit in a later stage from an output terminal 79.

The remaining constitution is the same as that described in the eighth and the following embodiments. The transform processing of the Fourier transform circuit 73 is exactly the same as that of the Fourier transform circuit 13 described in the eighth embodiment.

With the constitution of the fourteenth embodiment, four sets of data having shifted phases are obtained as orthogonally transformed data. Based on the received data of the four data sets, two differential demodulator circuits 77a and 77b conduct differential demodulation, irrespectively of each other. The Viterbi decoder 78 conducts Viterbi decoding processing using the two differentially decoded data.

Due to this, it is possible to conduct good Viterbi decoding processing based on the differentially demodulated data. In the case of the constitution of this embodiment, the count outputs of the counters 75a and 75b are directly supplied to the first and third selectors 74a and 74c. At the same time, the delay circuits 76a and 76b delay the count outputs by predetermined phase(s), which delayed count outputs are supplied to the second and fourth selectors 74b and 74d. Thus, by providing only two output order data generating means such as two counters, it is possible to conduct selection processing at appropriate timing using the four selectors 74a to 74d, by which degree the constitution can be made simple. It is noted that although counters are employed as output order data generating means in the constitution of FIG. 20 described in the fourteenth embodiment, the counters may be replaced by shift registers as described in the ninth embodiment.

Figure 21:
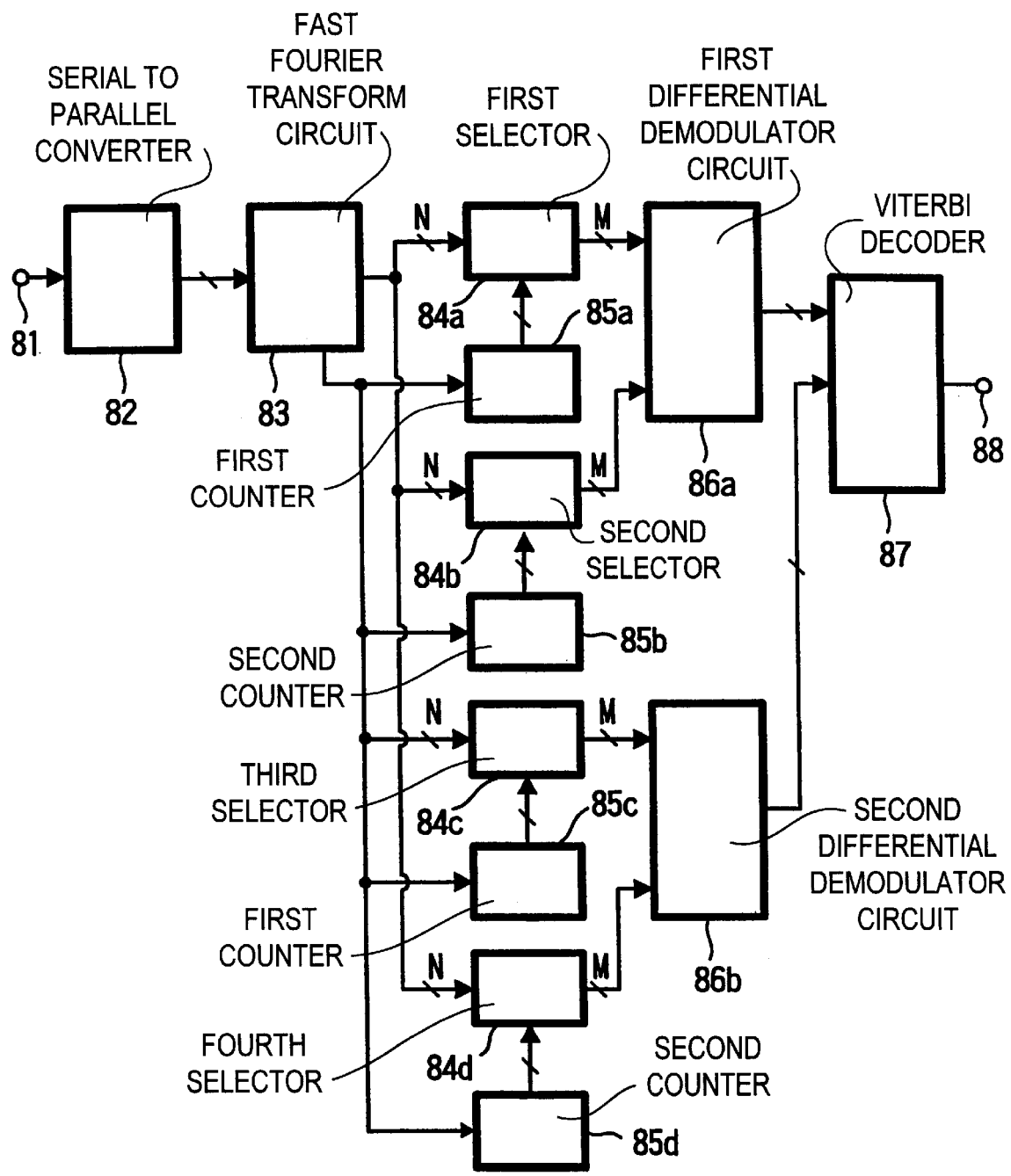
FIG. 21 is a block diagram showing an example of a constitution in the fifteenth embodiment according to the present invention.

The fifteenth embodiment according to the present invention will be described with reference to FIG. 21. In the fifteenth embodiment as in the case of the preceding embodiments, the present invention is applied to a demodulator part in a receiver receiving a radio-transmitted OFDM modulation signal. An OFDM modulation signal to be received is interleaved. FIG. 21 shows the constitution of the demodulator part in this embodiment. An OFDM modulation signal which is an intermediate frequency signal (or a base band signal) received is supplied to an input terminal 81. The OFDM modulation signal obtained at the input terminal 81 is supplied to a serial/parallel converter 82 and converted to parallel data of predetermined bits.

The parallel data outputted from the serial/parallel converter 82 is supplied to a Fourier transform circuit 83, in which orthogonal transform processing for transforming and then demodulating frequency axis data to time axis data by arithmetic operation by means of fast Fourier transform. N points of M-bit data are then generated and one point of M-bit data is set to each of N output registers (not shown) provided at an output part of the Fourier transform circuit 83.

The N points of data outputted from the Fourier transform circuit 83 are simultaneously supplied to the first, second, third and fourth selectors 84a, 84b, 84c and 84d. The first selector 84a is supplied with point designating data outputted by the first counter 85a serving as output order data generating means and thereby sequentially selects outputted points. The selected points of data are supplied to one input part of the first differential demodulator circuit 86a. The second selector 84b is supplied with point designating data outputted by the second counter 85b and thereby sequentially selects outputted points. The selected points of data are supplied to the other input part of the first differential demodulator circuit 86a.

The third selector 84c is supplied with point designating data outputted by the third counter 85c serving as output order data generating means and thereby sequentially selects outputted points. The selected points of data are supplied to one input part of the second differential demodulator circuit 86b. The fourth selector 84d is supplied with point designating data outputted by the fourth counter 85d and thereby sequentially selects outputted points. The selected points of data are supplied to the other input part of the second differential demodulator circuit 86b.

The counters 85a to 85d are circuits generating data for sequentially designating the N points in a predetermined order by means of count processing. The counters are constituted to generate data for sequentially designating the points in an order corresponding to the interleave pattern applied to the received OFDM modulation signal. When an output pulse is supplied to the counters from the Fourier transform circuit 83 or the like, the counters conduct the data generation processing. In this case, the counts of the first, second, third and fourth counters 85a to 85d are made at timing shifted from that of adjacent counters by a predetermined amount.

The first and second differential demodulator circuit 86a and 86b conduct differential demodulation using two sets of supplied data shifted each other by a predetermined phase (s), obtain differentially demodulated data and supply the demodulated data of the demodulators 86a and 86b to one and the other input parts of a Viterbi decoder 87, respectively. The Viterbi decoder 87 conducts Viterbi decoding processing using the two sets of supplied, demodulated data, obtains Viterbi-decoded data and supplies the decoded data to a circuit in a later stage from an output terminal 88.

The remaining constitution is the same as those described in the eighth and the following embodiments. The transform processing of the Fourier transform circuit 83 is exactly the same as that of the Fourier transform circuit 13 described in the eighth embodiment.

With the constitution of the fifteenth embodiment, four sets of data having shifted phases are obtained as orthogonally transformed data. Based on the received data of the four data sets, two differential demodulator circuits 86a and 86b conduct differential demodulation, irrespectively of each other. The Viterbi decoder 87 conducts Viterbi decoding processing using the differentially decoded data. Due to this, it is possible to conduct good Viterbi decoding processing based on the differentially demodulated data. In the case of the constitution of this embodiment, since the data selected by the four selectors are generated by the different output order data generating means, it is possible to conduct selection processing using the respective selectors at appropriate timing to thereby allow realizing good processing. It is noted that although counters are employed as output order data generating means in the constitution of FIG. 21 described in the fifteenth embodiment, the counters may be replaced by shift registers as described in the ninth embodiment.

Figure 22:
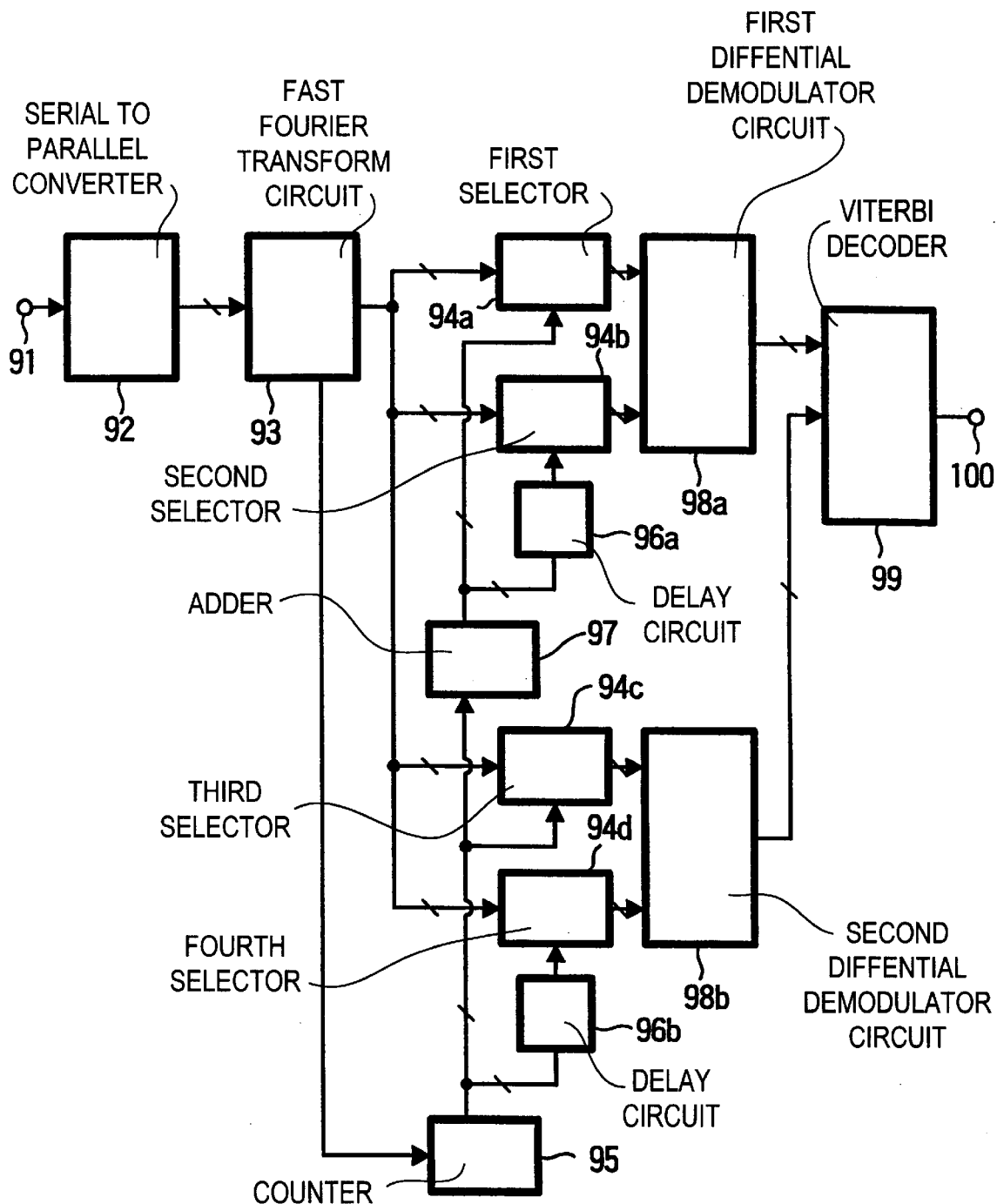
FIG. 22 is a block diagram showing an example of a constitution in the sixteenth embodiment according to the present invention.
Figure 23:
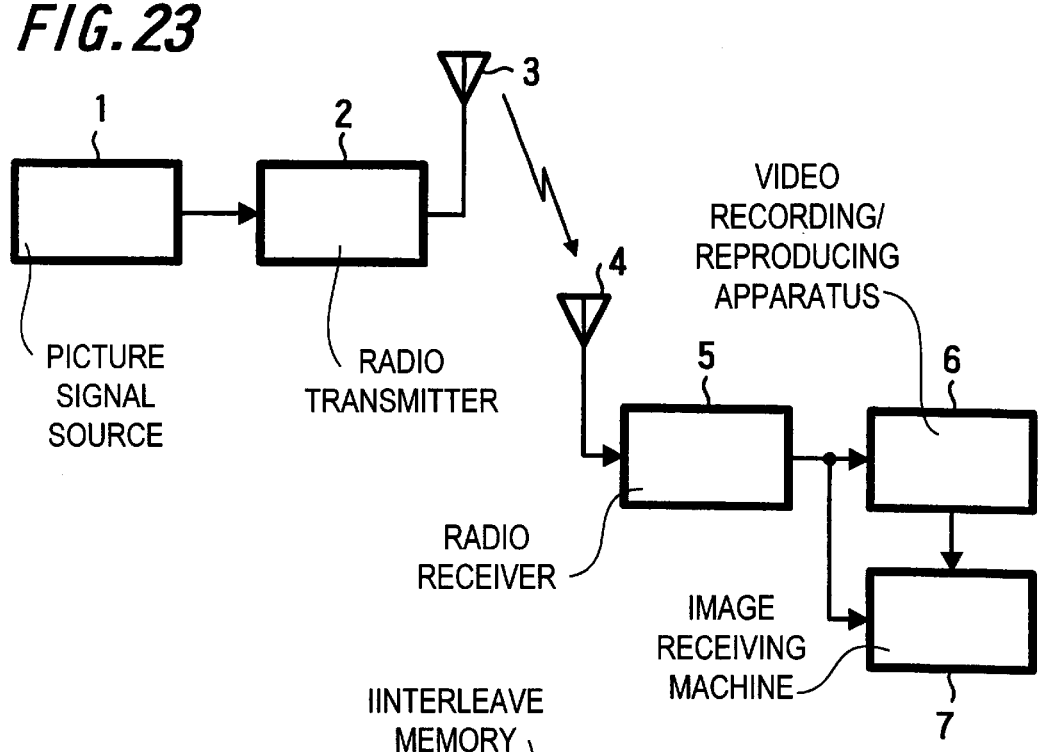
FIG. 23 is a block diagram showing an example of a radio transmission system.

The sixteenth embodiment according to the present invention will be described with reference to FIG. 22. In the sixteenth embodiment as in the case of the preceding embodiments, the present invention is applied to a demodulator part in a receiver receiving a radio-transmitted OFDM modulation signal. An OFDM modulation signal to be received is interleaved. FIG. 22 shows the constitution of the demodulator part in this embodiment. An OFDM modulation signal which is an intermediate frequency signal (or a base band signal) received is supplied to an input terminal 91. The OFDM modulation signal obtained at the input terminal 91 is supplied to a serial/parallel converter 92 and converted to parallel data of predetermined bits.

The parallel data outputted from the serial/parallel converter 92 is supplied to a Fourier transform circuit 93, in which orthogonal transform processing for transforming and then demodulating frequency axis data to time axis data by arithmetic operation by means of fast Fourier transform is carried out. N points of M-bit data are then generated and one point of M-bit data is set to each of N output registers (not shown) provided at an output part of the Fourier transform circuit 93.

The N points of data outputted from the Fourier transform circuit 93 are simultaneously supplied to the first, second, third and fourth selectors 94a, 94b, 94c and 94d. The first selector 94a is supplied to point designating data outputted by a counter 95 serving as output order data generating means with data obtained by subjecting arithmetic operation, i.e., adding a predetermined value (constant value) to the point designating data using an adder 97. The first selector 94a then sequentially selects outputted points based on the data. The selected points of data are supplied to one input part of the first differential demodulator circuit 98a. The second selector 94b is supplied to point designating data outputted by the counter 95 with data obtained by subjecting arithmetic operation, i.e., adding a predetermined value (constant value) to the point designating data using the adder 97 and data delayed by a predetermined phase(s) using a delay circuit 96b, which data is supplied as point designating data. The points of data selected based on the data are supplied to the other input part of the first differential demodulator circuit 98a.

The third selector 94c is directly supplied with point designating data outputted by the counter 95 as data for designating outputted points and supplies the points of data selected by the data to one input part of the second differential demodulator circuit 98b. The fourth selector 94d is supplied with data delayed by a predetermined phase(s) by a delay circuit 96a as the point designating data outputted by the counter 95. The points of data selected based on the data are supplied to the other input part of the second differential demodulator circuit 98b.

The counter 95 is a circuit generating data for sequentially designating the N points in a predetermined order by means of count processing. The counter is constituted to generate data for sequentially designating the points in an order corresponding to the interleave pattern applied to the received OFDM modulation signal. When an output pulse is supplied to the counters from the Fourier transform circuit 73 or the like, the counter conducts processing for generating the data.

The first and second differential demodulator circuit 98a and 98b conduct differential demodulation using two sets of supplied data shifted each other by a predetermined phase (s), obtain differentially demodulated data and supply the demodulated data of the demodulators 98a and 98b to one and the other input parts of a Viterbi decoder 99, respectively. The Viterbi decoder 99 conducts Viterbi decoding processing using the two sets of supplied, demodulated data, obtains Viterbi-decoded data and supplies the decoded data to a circuit in a later stage from an output terminal 100.

The remaining constitution is the same as that described in the preceding embodiments. The transform processing of the Fourier transform circuit 93 is exactly the same as that of the Fourier transform circuit 13 described in the eighth embodiment.

With the constitution of the sixteenth embodiment, four sets of data having shifted phases are obtained as orthogonally transformed data. Based on received data of the four sets, two differential demodulator circuits 98a and 98b conduct differential demodulation, irrespectively of each other. The Viterbi decoder 99 conducts Viterbi decoding processing using the two differentially decoded data. Due to this, it is possible to conduct good Viterbi decoding processing based on the differentially demodulated data. In the case of the constitution of this embodiment, only one counter is provided as output order data generating means and the four selectors conduct selection processing at appropriate timing by delaying and adding the output data of the single counter. This makes it possible to make the constitution of the output order data generating means simpler and make circuit arrangement simpler, as well. It is noted that although the counter is employed as output order data generating means in the constitution of FIG. 22 described in the sixteenth embodiment, the counter may be replaced by a shift register as described in the ninth embodiment.

What is claimed is:

1. A modulator comprising:

N registers to which predetermined data is simultaneously supplied, where N is an arbitrary integer;

output order data generating means for generating data for designating an output order of the data supplied to the N registers;

inverse Fourier transform means for transforming the supplied N data to data arranged on a frequency axis in a distributed manner at predetermined frequency intervals in the order designated by said output order data generating means;

convolutional coding means;

delay means for delaying one set of data out of two sets of data coded by the convolutional coding means by a one-clock time of the data; and hold means for temporarily holding the output order data outputted by said output order data generating means, and wherein one set of data delayed by the delay means and the other set of data outputted by said convolutional coding means are supplied to said register.

2. The modulator according to claim 1, wherein a shift register sequentially outputting data prepared in advance is employed as said output order data generating means.

3. A demodulation method comprising the step of:

transforming data arranged on a frequency axis in a distributed manner at predetermined frequency intervals using a Fourier transform to N points of data for every predetermined unit where N is an arbitrary integer; and selecting and outputting points of data designated by predetermined output order data from the transformed N points of data, wherein said output order data is sequentially generated by count processing.

4. The demodulation method according to claim 3, wherein said output order data causes data prepared in advance to be sequentially outputted.

5. The demodulation method according to claim 3, comprising the step of:

dividing said transformed N points of data into two sets of data, and selecting and outputting points from the two sets of data based on said output order data irrespectively of each other.

6. The demodulation method according to claim 5, comprising the step of:

conducting differential demodulation using said two sets of data which points are selected and outputted irrespectively of each other.

7. The demodulation method according to claim 6, comprising the step of:

delaying one set of data out of said two sets of data, which points are selected and outputted respectively, by a predetermined time.

8. The demodulation method according to claim 6, comprising the step of:

conducting Viterbi decoding using said two sets of data which points are selected and outputted irrespectively of each other.

9. The demodulation method according to claim 3, comprising the steps of:
dividing said transformed N points of data to four sets of data and individually selecting and outputting points from the four sets of data based on said output order data;
conducting differential demodulation using selected first set of data and second set of data;
conducting differential demodulation using selected third set of data and fourth set of data; and
conducting Viterbi decoding using the respective differentially demodulated data.

10. The demodulation method according to claims 9, comprising the steps of:
preparing first and second output order data as said output order data;
selecting the first set of data based on the first output order data;
selecting the second set of data based on data delayed by a predetermined time from the first output order data;
selecting the third set of data based on the second output order data; and
selecting the fourth set of data based on data delayed by a predetermined time from the second output order data.

11. The demodulation method according to claim 9, comprising the step of:
designating selected points of said four sets of data based on the output order data respectively generated.

12. The demodulation method according to claim 9, comprising the steps of:
selecting the third set of data based on predetermined output order data;
selecting the fourth set of data based on data delayed by a predetermined time from said predetermined output order data;
selecting the first set of data based on data obtained by adding a predetermined value to said predetermined output order data; and
selecting the second set of data based on data delayed by a predetermined time from the data obtained by adding the predetermined value to said predetermined output order data.

13. A demodulator comprising:
Fourier transform means for transforming data arranged on a frequency axis in a distributed manner at predetermined frequency intervals to N points of data for every unit, where N is an arbitrary integer;
selecting means for selecting and outputting designated points of data from the N points of data outputted by the Fourier transform means; and
output order data generating means for generating data for designated points selected by the selecting means, wherein
a counter sequentially generating data corresponding to an output order by means of count processing is employed as said output order data generating means.

14. The demodulator according to claim 13, wherein
the N points of data outputted by said Fourier transform means are supplied to first and second selecting means to individually select and output points based on an output of the output order data generating means.

15. The demodulator according to claim 14, comprising:
differential demodulation means, to which the points of data selected by said first selecting means and the points of data selected by said second selecting means are supplied, for conducting differential demodulation using the two sets of data.

16. The demodulator according to claim 15, wherein
an output of said output order data generating means is directly supplied to said first selecting means and to said second selecting means through delay means for delaying the output of said output order data generating means by a predetermined time.

17. The demodulator according to claim 14, comprising:
Viterbi decoding means, to which the points of data selected by said first selecting means and the points of data selected by said second selecting means are supplied, for conducting Viterbi decoding using the two sets of data.

18. The demodulator according to claim 13, wherein
the N points of data outputted by said Fourier transform means are supplied to first, second, third and fourth selecting means, and the selecting means individually select points based on an output of the output order data generating means;
points of data selected by said first and second selecting means are supplied to and differentially demodulated by a first differential demodulation means;
points of data selected by said third and fourth selecting means are supplied to and differentially demodulated by second differential demodulation means; and
the data differentially demodulated by said first and second differential demodulating means are supplied to and Viterbi decoded by Viterbi decoding means.

19. The demodulator according to claim 18, wherein
the demodulator comprises first and second output order data generating means as said output order data generating means; and
an output of said first output order data generating means is directly supplied to said first selecting means and supplied to said second selecting means through delay means for delaying the output of said first output order data generating means by a predetermined time, and an output of said second output order data generating means is directly supplied to said third selecting means and supplied to said fourth selecting means through delay means for delaying the output of said second output order data generating means by a predetermined time.

20. The demodulator according to claim 18, wherein
data for designating the points selected by said first, second, third and fourth selecting means are supplied from individual output order data generating means for the first, second, third and fourth selecting means.

21. The demodulator according to claim 18, wherein
an output of said output order data generating means is directly supplied to said third selecting means and supplied to said fourth selecting means through first delay means for delaying the output of said output order data generating means by a predetermined time, and
an output of arithmetic operation means for adding a predetermined value to the output of said output order data generating means, is directly supplied to said first selecting means and supplied to said second selecting means through second delay means for delaying the output of the arithmetic operation means by a predetermined time.

* * * * *